(12) United States Patent
Taniguchi

(10) Patent No.: US 7,460,601 B2
(45) Date of Patent: Dec. 2, 2008

(54) VIDEO DATA TRANSMITTING/RECEIVING METHOD AND VIDEO MONITOR SYSTEM

(75) Inventor: Koji Taniguchi, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1366 days.

(21) Appl. No.: 10/282,599

(22) Filed: Oct. 29, 2002

(65) Prior Publication Data

US 2003/0093810 A1 May 15, 2003

(30) Foreign Application Priority Data

Oct. 30, 2001 (JP) ............................ 2001-332220

(51) Int. Cl.
*H04N 7/18* (2006.01)
(52) U.S. Cl. ................................. 375/240.26
(58) Field of Classification Search ................................
375/240.01–240.29
See application file for complete search history.

(56) References Cited

U.S. PATENT DOCUMENTS

| | | | |
|---|---|---|---|
| 5,969,755 A | 10/1999 | Courtney | |
| 6,357,042 B2 * | 3/2002 | Srinivasan et al. | 725/32 |
| 7,149,755 B2 * | 12/2006 | Obrador | 707/104.1 |

FOREIGN PATENT DOCUMENTS

| | | |
|---|---|---|
| EP | 1 079 623 | 2/2001 |
| EP | 1 083 568 A | 3/2001 |
| EP | 1 170 943 A | 1/2002 |
| JP | 8-77468 | 3/1996 |
| JP | 11-32321 | 2/1999 |
| JP | 2000-20857 | 1/2000 |
| JP | 2000-261742 | 9/2000 |
| JP | 2000-353390 | 9/2000 |
| JP | 2000-287165 | 10/2000 |
| JP | 2000-350125 | 12/2000 |

OTHER PUBLICATIONS

European Search Report for EP 02 02 3926, dated Oct. 17, 2003.
Chang et al., "Multimedia Search and Retrieval", Marcel Dekker, Inc., (2000), pp. 559-584.

* cited by examiner

*Primary Examiner*—Andy S Rao
(74) *Attorney, Agent, or Firm*—RatnerPrestia

(57) ABSTRACT

In a video data transmitting method of sending in real-time video data being externally inputted, when encoding video data being inputted as stream data, start and stop of an encoding process is repeated at a predetermined time interval to carry out a data dividing process whereby a plurality of time-continuous video data are generated as partial video data. Also, metadata of partial video data is generated, which is sent, together with the partial video data, in real-time as partial video metadata.

16 Claims, 18 Drawing Sheets

FIG.4

CT001_0100_001.pmd

- Terminal-unit Indivisual Identifier
- Whole Video Data No.
- Partial Video Data No.

Extender
hdr : Metadata Header File Extender
ftr : Metadata Footer File Extender
pmd : Partial Video Metadata File Extender
pvid : Partial Video Data File Extender Partial Video Metadata

```
CT001_0100.hdr          : Metadata Hedder File
CT001_0100_001.pmd      : Partial Video Metadata File 1
CT001_0100_002.pmd      : Partial Video Metadata File 2
CT001_0100_003.pmd      : Partial Video Metadata File 3
          :
          :
CT001_0100_099.pmd      : Partial Video Metadata File 99
CT001_0100_100.pmd      : Partial Video Metadata File 100
CT001_0100.ftr          : Metadata Footer File
```

Partial Video Data

```
CT001_0100_001.pvid     : Partial Video Data File 1
CT001_0100_002.pvid     : Partial Video Data File 2
CT001_0100_003.pvid     : Partial Video Data File 3
          :
          :
CT001_0100_099.pvid     : Partial Video Data File 99
CT001_0100_100.pvid     : Partial Video Data File 100
```

FIG.5

```
<Partial Video Metadata>
  <Link Information>
    <Partial Video Data>CT001_0100_002.pvid</Partial Video Data>
    <Partial Video Metadata>
      <prev>CT001_0100_001.pmd</prev>
      <this>CT001_0100_002.pmd</this>
      <next>CT001_0100_003.pmd</next>
    </Partial Video Metadata>
  </Link Information>
  <Leading- end Parameter>
    <Recording Start Date>
      <Date>2001.06.10</Date>
      <Time of Day>15:00:00</Time of Day>
    </Recording Start Date>
    <Start-scene No.>100</Start-scene No>
  </Leading- end Paramete>
  <Scene Meatadata>
    <Scene No.>100</Scene No>
    <Scene Fixing Information>Fixed</Scene Fixing Information>
    <Number of Frames>120</Number of Frames>
    <Recording Date >
      <Recording Start Date>
        <Date>2001.06.10</Date>
        <Time of Day>15:00:00</Time of Day>
      </Recording Date/Hour>
      <Recording End Date>
        <Date>2001.06.10</Date>
        <Time of Day>15:05:00</Time of Day>
      </Recording End Date/Hour>
    </Recording Date>
    <Video Analysis Result>
      <Number of Moving Objects>0</Number of Moving Objects>
    </Video Analysis Result>
  </Scene Metadata>

~~~ Scene Metadata List ~~~

<Scene Metadata>
    <Scene No.>111</Scene No.>
    <Scene Fixed Information>Fixed</Scene Fixed Information>
    <Frame No.>130</Frame No.>
    <Recording Date>
      <Recording Start Date>
        <Date>2001.06.10</Date>
        <Time of Day>15:55:00</Time of Day>
      </Recording Start Date>
      <Recording End Date>
        <Date>2001.06.10</Date>
        <Time of Day>16:00:00</Time of Day>
      </Recording End Date>
    </Recording Date>
    <Video Analysis Result>
      <Number of Moving Objects>0</Number of Moving Objects>
    </Video Analysis Result>
  </Scene Metadata>
  <End Parameter>
    <Recording End Date>
      <Date>2001.06.10</Date>
      <Time od Day>16:00:00</Time od Day>
    </Recording End Date>
    <End Scene No.>111</End Scene No.>
  </End Parameter>
</Partial Video Metadata>
```

FIG.6

```
<Header File>
   <Link Information>
      <Header File>CT001_0100.hdr</Header File>
      <Footer File>CT001_0100.ftr</Footer File>
      <Leading-end Data>CT001_0100_001.pmd</Leading-end Data>
   </Link Information>
   <Attribute Information>
      <Terminal-Unit Indivisual No.>CT001</Terminal-Unit Indivisual No.>
      <Whole Video Data No.>100</Whole Video Data No.>
      <Encode Scheme>MPEG4</Encode Scheme>
      <Image Size>
         <Width>320</Width>
         <Height>240</Height>
      </Image Size>
      <Framerate>10fps</Framerate>
      <Bitrate>256kbps</Bitrate>
      <Recording Start Date>
         <Date>2001.06.10</Date>
         <Time of Day>15:00:00</Time of Day>
      <Recording Start Date>
   </Attribute Information>
</Header File>
```

FIG.7

```
<Footer File>
  <Link Information>
     <Headder File>CT001_0100.hdr</Headder File>
     <Footer File>CT001_0100.ftr</Footer File>
     <Terminal-Unit Data>CT001_0100_100.pmd</Terminal-Unit Data>
  </Link Information>
  <Attribute Information>
     <Recording End Date>
       <Date>2001.06.10</Date>
       <Time of day>16:00:00</Time of day>
     <Recording End Date
  </Attribute Information>
</Footer File>
```

Fig.8A

```
<Scene Metadata>
   <Scene No.>100</Scene No.>
   <Scene Fixing Information>Provisional</Scene Fixing Information>
   <Number of Frames>60</Number of Frames>
   <Recording Date>
      <Recording Start Date>
         <Date>2001.06.10</Date>
         <Time of Day>15:00:00</Time of Day>
      </Recording Start Date>
      <Recording End Date>
         <Date>2001.06.10</Date>
         <Time of Day>15:02:30</Time of Day>
      </Recording End Date>
   </Recording Date>
   <Video Analysis Result>
      <Number of Moving Objects>0</Number of Moving Objects>
   </Video Analysis Result>
</Scene Metadata>
```

FIG.8B

```
<Scene Metadata>
   <Scene No.>100</Scene No.>
   <Scene Fixing Information>Fixed</Scene Fixing Information>
   <Number of Frames>120</Number of Frames>
   <Recording Date>
      <Recording Start Date>
         <Date>2001.06.10</Date>
         <Time of Day>15:00:00</Time of Day>
      </Recording Start Date>
      <Recording End Date>
         <Date>2001.06.10</Date>
         <Time of Day>15:05:00</Time of Day>
      </Recording End'Date>
   </Recording Date>
   <Video Analysis Result>
      <Number of Moving Objects>0</Number of Moving Objects>
   </Video Analysis Result>
</Scene Metadata>
```

FIG.8C

```
<Scene Metadata>
   <Scene No.>101</Scene No.>
   <Scene Fixing Information>Provisional</Scene Fixing Information>
   <Number of Frames>20</Number of Frames>
   <Recording Date>
      <Recording Start Date>
         <Date>2001.06.10</Date>
         <Time of Day>15:05:00</Time of Day>
      </Recording Start Date>
      <Recording End Date>
         <Date>2001.06.10</Date>
         <Time of Day>15:05:30</Time of Day>
      </Recording End Date>
   </Recording Date>
   <Video Analysis Result>
      <Number of Moving Objects>1</Number of Moving Objects>
   </Video Analysis Result>
</Scene Metadata>
```

File Groups Stored in Video Receiving Apparatus v2_md_hdr : Metadata Header File of Partial Video Data 2
v2_pmd2  : 2nd Partial Video Metadata File of Partial Video Data 2
v2_pvid3 : 2nd Partial Video Data File of Partial Video Data 2

VIDEO DATA TRANSMITTING/RECEIVING METHOD AND VIDEO MONITOR SYSTEM

FIELD OF THE INVENTION

The present invention relates to a video data transmitting/receiving method for transmitting/receiving video data and a video monitor system.

BACKGROUND OF THE INVENTION

The video monitor system, aiming at monitoring against intruders, conventionally uses a time-lapse VTR or the like. The time-lapse VTR can continuously record, frame by frame, the video signal inputted from a video camera at a constant interval of several to several tens seconds, over several tens hours.

In the time-lapse VTR, there is restriction in recording time to an analog videotape. Hence, recording time is increased by implementing video recording in a feed-frame way. However, where a recorded video image is utilized in crime investigation for example, there is possibly a case requiring a video with such a high frame rate that can confirm a detailed behavior of an intruder instead of a video feed frame.

There are known arts, meeting such a requirement, described in JP-A-08-77468, JP-A-2000-253390 and JP-A-2000-20857. The arts describing them lies in that video-image analyzing means is provided in a system having a monitor camera on a video-image sending side whereby only when there is significant information (e.g. a moving object) in a video image, the video image is to be sent. Thus, recording time is increased by recording solely the image containing significant information instead of by increasing recording time due to video feed frame.

Meanwhile, JP-A-11-32321 describes a monitor system which detects an video image at an occurrence of abnormality by image recognition and records abnormality information simultaneously with recording a video image so that a video image of upon occurring abnormality can be rapidly searched by making reference to a list of abnormality information.

Although the foregoing conventional example sends only video data detected of significant information by video analysis, there exist recognition errors in the video recognition process with a computer. Namely, there is a fear of situation that the video observer overlook significant information in a video image or that significant information be not left on the record.

Meanwhile, in the video monitor system, when storing the video data being sent continuously for a long time, there is a need to concurrently carry out a storage process of video data and a search/display process of video data. However, the foregoing prior art does not present a method to search/display a data file of video data.

SUMMARY OF THE INVENTION

It is an object of the present invention to facilitate long-time recording of video data and search process through large-capacity video data in a video monitor system configured by a plurality of video transmitting apparatuses and a video receiving apparatuses for receiving, displaying and storing video data.

Also, it is an object to realize concurrent execution of storage and search processes of identical video data.

Also, it is an object to rapidly search for an video image of upon occurrence of abnormality such as an intruder, thereby relieving a video monitoring person of burden in searching for abnormality occurrence.

The present invention is a method of transmitting in real-time video data being externally inputted, comprising: a video encoding process step of, when making an encoding process on video data being inputted as stream data, repeating to start and end an encoding process at a predetermined time interval and carrying out a data dividing process to generate a plurality time-continuous of video data, and outputting the same as partial video data; a video data transmitting step of sending in real-time the partial video data; a metadata generating step of generating metadata of the partial video data and outputting the same as partial video metadata; and a metadata transmitting step of sending the partial video metadata.

According to this configuration, when sending video data continuously over a long time, whole video data is segmented at a predetermined time interval to send a plurality of partial video data. Consequently, the reception-sided system can store long video data by easily dividing it into a plurality of partial video data files without carrying out complicated video data analysis. Meanwhile, because of sending partial video metadata corresponding to partial video data in concurrent with sending video data, the reception-sided system is allowed to conduct search on already-received partial video data of whole video data under reception by the utilization of sole already-received metadata.

BRIEF DESCRIPTION OF THE DRAWINGS

FIG. 4 is a figure showing an example of a file naming rule;

FIG. 5 is a figure showing a description example of partial video metadata;

FIG. 6 is a figure showing a description example of a header file of whole video metadata;

FIG. 7 is a figure showing a description example of a footer file of whole video metadata;

FIGS. 8A, 8B and 8C are a view explaining a method to make reference to a file during video data search;

DESCRIPTION OF THE EXEMPLARY EMBODIMENT

Exemplary embodiment of the present invention is demonstrated hereinafter with reference to the accompanying drawings.

Exemplary Embodiment

Figure 1:
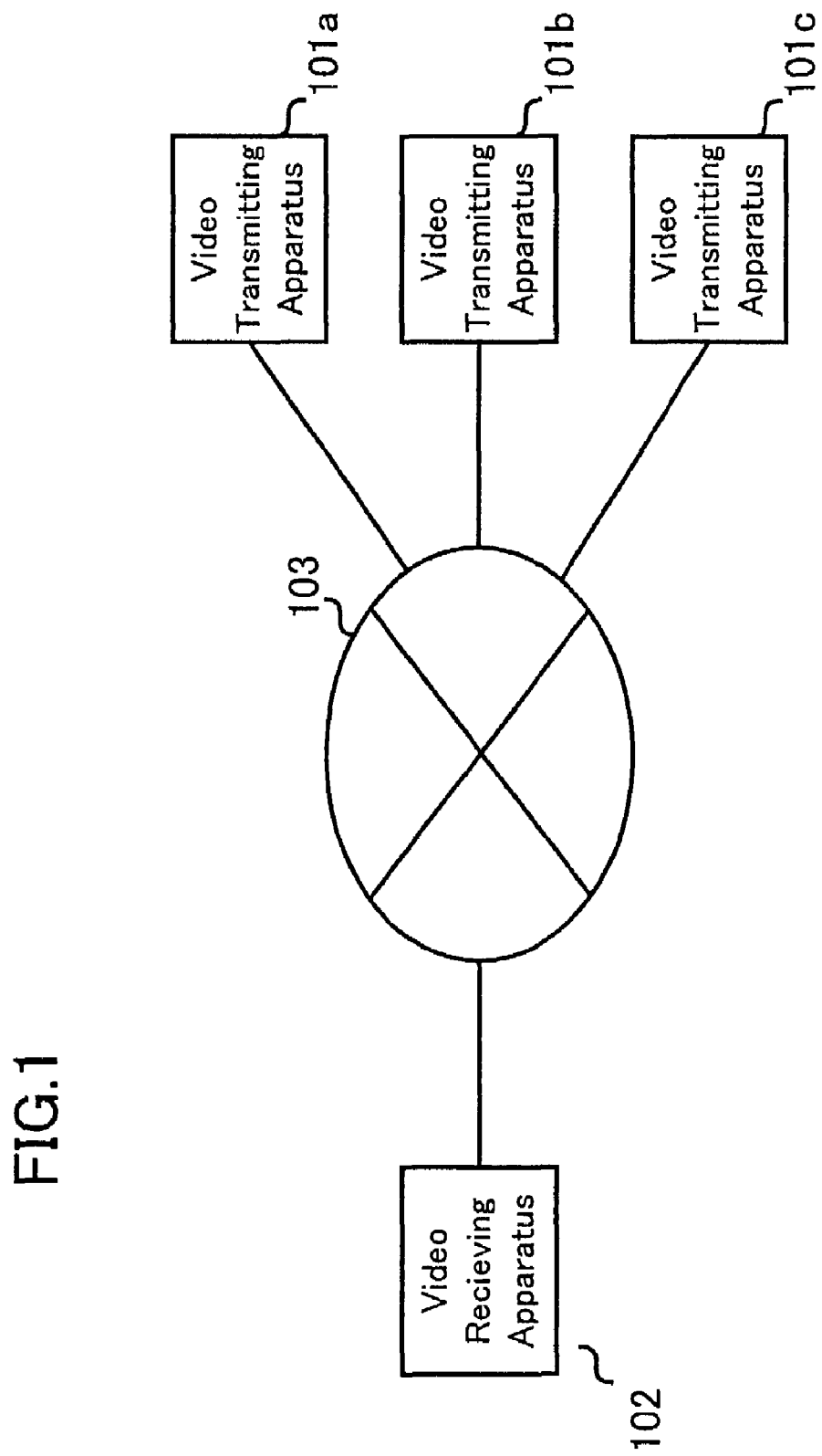
FIG. 1 is a block diagram showing a configuration of a video monitor system in Embodiment 1 of the present invention.

In FIG. 1, a video transmitting apparatus 101a, 101b, 101c transmits in real-time the video data acquired from a video camera, as stream data, to a video receiving apparatus 102. Simultaneously with sending the video data, also sent is the metadata of the video data. The video transmitting apparatus 101a, 101b, 101c may be a monitor camera configured only by hardware, or an arbitrary terminal unit, such as a personal computer, a PDA (Personal Digital Assistance) or a cellular phone, having an installed software program, image-data input means, video-data transmitting means and so on.

The video receiving apparatus 102 receives the video stream data sent in real-time from the plurality of video transmitting apparatuses 110a, 101b, 101c and the metadata of the video stream data, and stores these data. The video receiving apparatus 102, also, has functions to display the video data being received and to search video data by the utilization of stored metadata. The video receiving apparatus 102 may be an apparatus configured only by hardware, or a computer system having a software program installed thereon, means to display video data, a database to manage video data and so on.

A communication network 103 connects between the video transmitting apparatuses 110a, 101b, 101c and the video receiving apparatus 102. This may be an arbitrary network, such as a WAN (Wide Area Network), LAN (Local Area Network), radio network or a combination thereof provided that communications are possible mutually between the video transmitting apparatus 101a, 101b, 101c and the video receiving apparatus 102.

The video transmitting apparatus 101a, 101b, 101c transmits in real-time the video data, inputted from the video camera, to the video receiving apparatus 102. The video data, to be outputted by the video transmitting apparatus 101, is encoded by an arbitrary encode scheme, such as MPEG4 or H.263, and then sent through the use of a communication path free from missing data, i.e. communication path secured with a network resource. Incidentally, although it is possible to use a communication path over which data missing possibly occurs during video transmission, a certain countermeasure should be taken against such data missing.

The video transmitting apparatus 101a, 101b, 101c possesses means for data analysis and carries out a detecting process of significant information in video data and a scene-dividing process of video data. Based on a result of the data analysis, scene-based metadata is generated and sent to the video receiving apparatus 102. The metadata is sent in concurrent with sending the video data, while being in moderate synchronism therewith.

The video receiving apparatus 102 receives the video data being sent from the video transmitting apparatus 101a, 101b, 101c, to carry out a process of real-time displaying with the received video data and a process of storage to the database. A video monitoring person, who is a user of the video receiving apparatus 102, monitors whether or not there is significant information included in the video data being sent from the plurality of video transmitting apparatuses 101a, 101b, 101c.

The video receiving apparatus 102 has a function to notify a video data portion including significant information due to the metadata analyzing process to the video monitoring person, thereby relieving the video monitoring person of burden. Meanwhile, immediate search for a video scene is possible by utilizing the metadata stored in the database.

Herein, explanation is made on "significant information", "scene division" and "metadata" with greater detail.

"Significant information" refers to information that a video-monitoring person is seeking for detection, e.g. a video image data portion having an object not to exist in the usual time is referred to as an "image data region including significant information".

"Scene division" refers to a process to divide time-continuing image data into a plurality of video data portions, e.g. corresponding to a process to divide video data into a portion a moving object is present and a portion a moving object is not present, depending upon a certain determination criterion. Meanwhile, a process to divide video data simply based on a reference unit time is also "scene division".

"Metadata" refers to data describing information in various kinds accompanied by video data or a data analysis result, which is data separately independent of "video data" This embodiment describes, as metadata, video-data file name (identifiers), encode scheme kind, image size, video-recording start time, video-recording end time, each-scene start and end time, presence or absence of a moving object in a scene, link relationship between video data files and so on, according to a data description language analogous to XML (eXtensible Markup Language) or multimedia content describing specification such as MPEG7.

Explanation is now made on a format of the image data to be sent by the video transmitting apparatus 101a, 101b, 101c. The video transmitting apparatus 101a, 101b, 101c transmits video data continuously for a long time to the video receiving apparatus 102. On the other hand, the video receiving apparatus 102 receives the video data sent by the video transmitting apparatus 101a, 101b, 101c, and stores them. Herein, "for a long time" means a time ranging from several hours to several days, or a time period of from a start-up of the video transmitting apparatus 101a, 101b, 101c to a shut down thereof.

In this case, should the video data in transmission/reception is dealt with as a simple one of stream data, the video data file for storage in the video receiving apparatus 102 is kept open and continuously written by data for a long time, resulting in an increased data size. Such a video data file is not easy for data management, raising a problem in data processing, such as of search, display, duplication and the like.

As one approach to avoid the problem, there is a method of storing video data while segmenting it to a proper data size within the video receiving apparatus 102. However, in the case of dealing with the video data encoded by an arbitrary encode scheme, the video receiving apparatus 102 is complicated in internal configuration because file segmentation relies upon the encode scheme. Accordingly, instead of simply, continuously transmitting video data by the video transmitting apparatus 101a, 101b, 101c, a hierarchical structure is provided to video data to transmit the video data while segmenting it at a proper time interval. In this embodiment, the data hierarchical structure is with three hierarchical layers, i.e. "whole video data", "partial video data" and "scene data".

Figure 2:
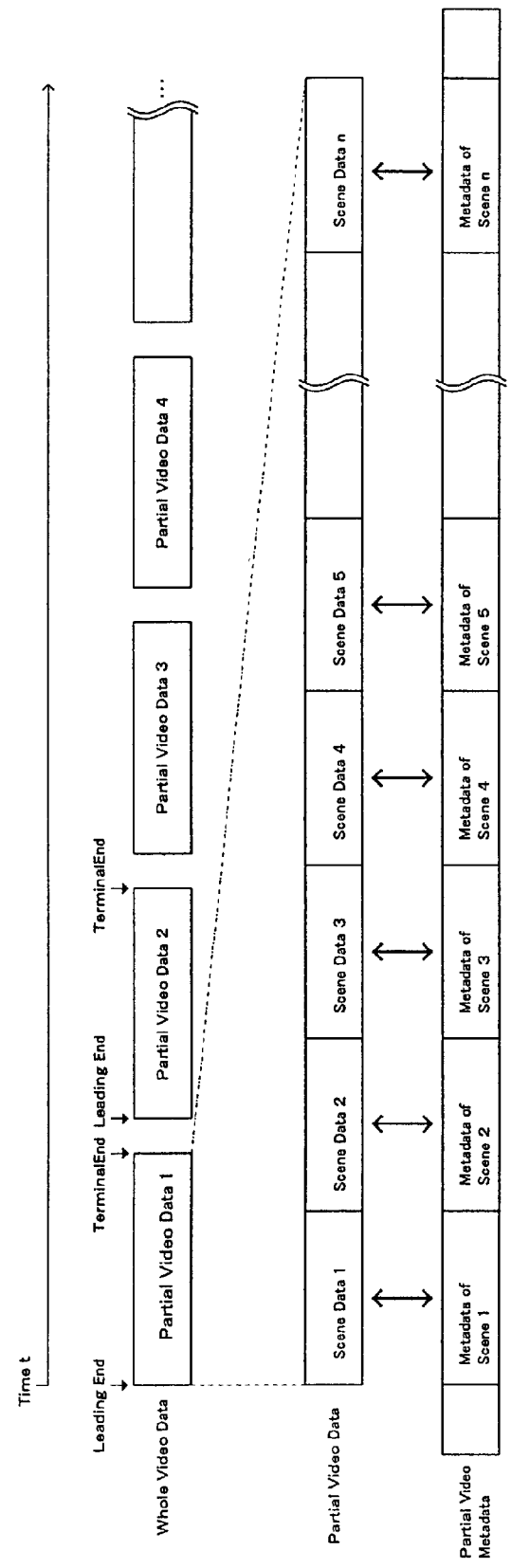
FIG. 2 is a figure showing a relationship between whole video data and partial video data.

FIG. 2 illustrates a relationship between whole video data, partial video data and scene data. "Whole video data" refers to the whole video data to be continuously sent by one video transmitting apparatus 101a, 101b, 101c. On the contrary, "partial video data" is a part of whole video data segmented with a proper length. The individual partial video data is independent video data to be singly decoded/displayed. In other words, whole video data is configured with a plurality of partial video data that are time-continuous. For example, in the case the video transmitting apparatus 101a, 101b, 101c is in continuous operation on weekdays while shut down on Saturday and Sunday wherein, during operation, dividing process is made to repeat a start/end of video encode process on video data at a time interval of 1 hour, a series of video data on weekdays is "whole video data" while the video data segmented by 1 hour is "partial video data".

In this manner, because the video transmitting apparatus 101a, 101b, 101c transmits whole video data while segmenting it into partial video data, the video receiving apparatus 102 is allowed to store received video data as a plurality of time-continuous video data files instead of storing it as one video data file.

Note that, hereinafter, in case "whole video data" and "partial video data", need not to be especially differentiated, are each merely referred to as "video data".

Explanation is now made on "scene data". As in the foregoing, the video transmitting apparatus 101 has means for conducting video data analysis to carry out a scene dividing process on video data. Hence, the partial video data is further segmented into scene data. Note that each one of scene data, not data separately independent of as a discrete data file, means a logical segment of partial video data. Meanwhile, partial video data itself does not contain information about scene data. The information about a scene structure of partial video data is described in metadata of the partial video data.

From now on, metadata of partial video data is referred to as "partial video metadata". Meanwhile, because whole video data also has metadata similarly to partial image data having metadata, the metadata of whole video data is referred to as "whole video metadata".

Figure 3:
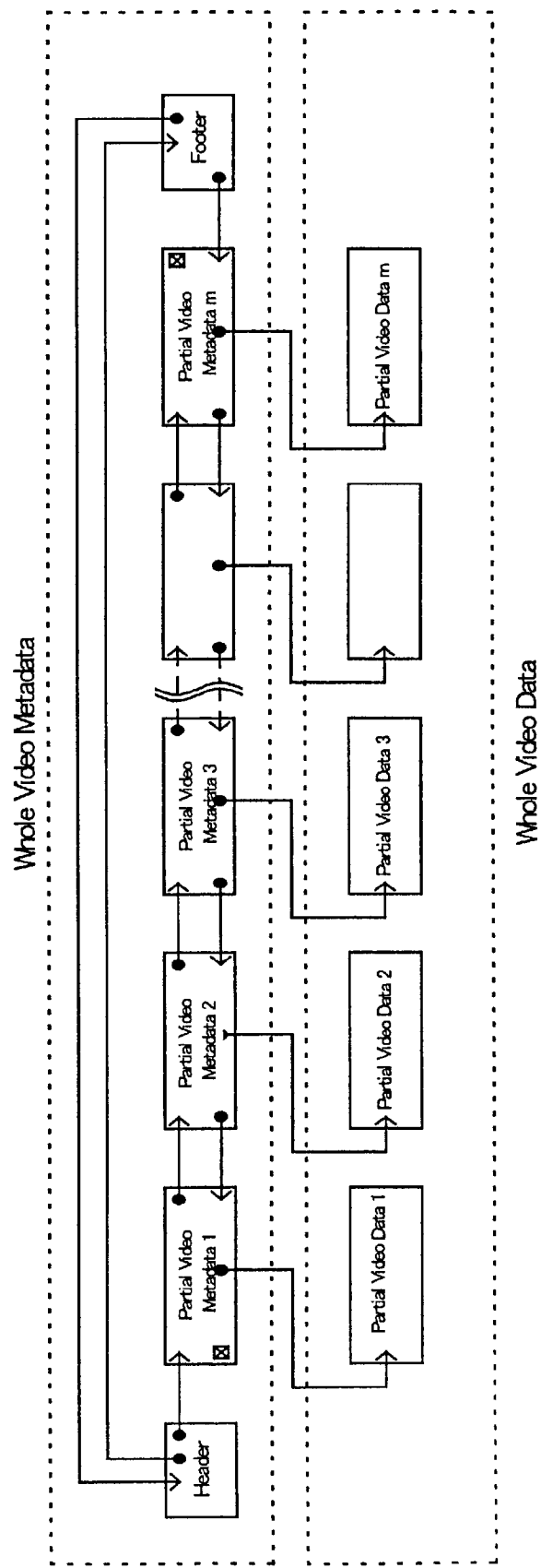
FIG. 3 is a figure showing a relationship between whole video metadata and whole video data.

FIG. 3 illustrates a relationship between whole video metadata, partial video metadata and partial video data. One of partial video data necessarily has one of partial video metadata. The partial video metadata describes a link relation with partial video data. On the other hand, whole video metadata is structured with a plurality of time-continuous partial video metadata. Each of partial video metadata describes a link relation with the preceding and succeeding partial video metadata.

Specifically, partial video metadata has, as its one description element, a file name (i.e. address information specifying data location) of the preceding partial video metadata and a file name of the succeeding partial video metadata.

Such a data structure can keep a time-successive relationship with the partial video metadata separately independent of as a data file. Hence, a set of partial video metadata serves also as "total video metadata". Furthermore, a correspondence is readily taken between "partial video data" and "partial video metadata", to facilitate data file management in the video receiving apparatus 102.

However, in order to describe the file names of the preceding and succeeding partial video metadata in partial video metadata, there is a need to previously determine file names of partial video metadata in the video transmitting apparatus 101. For this reason, the video transmitting apparatus 101, upon generating metadata, determines file names of partial video metadata and describes the file names of the same of partial video metadata in a description element of partial video metadata. Namely, the partial video metadata describes, as its description elements, three kinds of partial video metadata file names, i.e. a file name of its own partial video metadata, a file name of the preceding partial video metadata and a file name of the succeeding partial video metadata. The video receiving apparatus 102 confirms the file names described in the received partial video metadata and opens the data files by the use of the file names to write partial video metadata therein.

Consideration is herein made on a case to search over the video data stored in the video receiving apparatus 102. The video receiving apparatus 102 is stored with all of the whole video data received from the plurality of video transmitting apparatuses 101a, 101b, 101c. Each of the whole video data is divided into a plurality of partial image data files. Similarly, the whole video metadata is also divided into a plurality of partial video metadata files.

Although metadata is first searched upon conducting video data search, it is extremely inefficient to randomly access a great deal of partial video metadata to find partial video metadata satisfying a search condition. Then, header and footer files are added to the whole video metadata in order to search step-by-step. Upon conducting video data search, the whole video metadata satisfying the search condition are specified by referring the header files of the whole video metadata in first step. Next, the partial video data satisfying the search condition are specified by referring in turn a plurality of partial video metadata consisting whole video metadata.

The header file of whole video metadata is a file separately independent of the partial video metadata file, and described with at least a file name of partial video metadata to position at a leading end of the whole video metadata. Similarly, the footer file of whole video metadata is a file separately independent of the partial video metadata file, and described with at least a file name of partial video metadata to position at a terminal end of the whole video metadata.

The header file of whole video metadata has link information to a footer file, while the footer file of whole video metadata has link information to a header file. This is in order to make the partial video metadata file group in a circular list structure.

On the other hand, the partial video metadata at the leading end of the whole video metadata does not have link information to a header file, while the partial video metadata at the terminal end of the whole video metadata does not have link information to a footer file. This is because of a definition that a header/footer file belongs to whole video metadata and has a different hierarchical level from each of partial video metadata files.

In the meanwhile, the video receiving apparatus 102 stores a number of video data files and the metadata files thereof. In such a system managing a number of data files, emphasis is placed on a naming rule of files. FIG. 4 shows an example of naming rule of files of partial video data and partial video metadata. In this example, the file name is configured with an individual identification number to identify a video transmitting terminal 101 as a video data transmission source, an whole video data identification number, a partial video data identification number (=sequence number), wherein different extenders are provided to between the partial video data file, the partial video metadata file and the header/footer file thereof. In this manner, the header/footer file of whole video metadata is provided with a file name readily distinguished from the partial video metadata file.

Explanation is now made on a metadata format, by using FIGS. 5 to 7. FIG. 5 is an description example of partial video metadata. The partial video metadata is described in an imaginary data description language similar to XML, and configured with "link information", "leading end parameter", "scene metadata" and "terminal end parameter". In link information, described are file names of related data files, i.e. a file name of the preceding partial video metadata, a file name of its own partial video metadata, a file name of the succeeding partial video metadata and a file name of the partial video data.

In leading-end and terminal-end parameters, described is information of recording date/hour of partial video data, scene number and so on.

In scene metadata, included are various pieces of information related to the scene, e.g. scene number, scene fixing information (detail is to be described later), the number of frames in the scene, recording date/hour, video analysis result and so on. Also, scene metadata is included in the number of divided scenes in the partial video metadata.

Such partial video metadata is generated in the video transmitting apparatus 101, which is to be sent to the video receiving apparatus 102.

The video transmitting apparatus 101, prior to sending partial video metadata, generates a header file of whole video metadata and sends it to the video receiving apparatus 102. Meanwhile, the video transmitting apparatus 101, after having sent all the partial video metadata constituting whole video metadata, subsequently generates a footer file of the whole video metadata and sends it to the video receiving apparatus 102.

FIG. 6 is a description example of a header file of whole video metadata while FIG. 7 is a description example of a footer file of whole video metadata. These header/footer files are described in an imaginary data description language analogous to XML similarly to the case of partial video metadata, i.e. described with link information to a related data file and various pieces of information common to whole video data, e.g. recording date/hour and identifiers of a terminal unit having taken a video image, kind of video encode scheme, an image size, frame rate (fps), bit rate (bps) and so on.

Explanation is now made on a method to send partial video metadata. The video transmitting apparatus 101 divides video data into a plurality of ones of partial video data to send partial video data and partial video metadata to the video receiving apparatus 102, instead of simply sending video data. Also, the video transmitting apparatus 101 divides partial video data into a plurality of scenes, and describes information about scene division of the partial video in partial video metadata.

Partial video data is stream data to be sent and received in real-time whereas partial video metadata is a text file as in the example of FIG. 5.

One partial video data has an arbitrary recording time. For example, provided that whole video data has a recording time of 24 hours and partial video data has a recording time of 1 hour, the video receiving apparatus 102 cannot utilize the metadata of the partial video data until elapsing 1 hour from a start of receiving partial video data.

Namely, in the case the video transmitting apparatus 101 generates a complete partial video metadata file and sends it to the video receiving apparatus 102, the video receiving apparatus 102 is not allowed to make reference to the partial video metadata before completing the reception of the partial video data.

However, real-time property is important for a video monitoring system. It is desired to utilize metadata also for partial video data being sent or received. For this reason, the video transmitting apparatus 101 transmits partial video metadata by dividing it based on scene metadata instead of sending partial video metadata as one data file.

The video transmitting apparatus 101 transmits the partial video metadata shown in FIG. 5 by the following procedure.

(1) Prior to sending partial video data, sent are link information to partial video metadata and a leading end parameter.
(2) A scene dividing process on partial video data is carried out concurrently with sending the partial video data.
(3) Each time a scene division result is outputted, scene metadata is generated and the scene metadata is sent.
(4) When reaching a terminal end of the partial video data, a terminal-end parameter is sent.

Namely, the video transmitting apparatus 101 generates scene metadata in synchronism with a scene dividing process of video data, and sends it to the video receiving apparatus 102. On the other hand, the video receiving apparatus 102 connects the link information, leading end parameters, plurality of scene metadata and terminal-end parameters sent from the video transmitting apparatus 101, to generate partial video metadata and store it as one data file.

Explanation is now made on the "scene fixing information" contained in scene metadata. The "scene fixing information" of scene metadata is information representative of whether the scene metadata is a provisional or a fixed one.

Although the video transmitting apparatus 101 carries out scene division of partial video data on the basis of video analysis, unless there is a change in the video data over a long time, the time of one scene increases. In a certain case, there is a possibility that partial video data is not divided into a plurality of scenes resulting in having one sole scene. In such a situation, there is increase of time interval the video transmitting apparatus 101 sends scene metadata, lowering the convenience in metadata search in the video receiving apparatus 102.

For this reason, the video transmitting apparatus 101 carries out provisional scene division at a regular interval regardless of a result of scene division due to video analysis, thereby transmitting scene metadata to the video receiving apparatus 102.

Hereinafter, the scene metadata that scene division is provisional is referred to as "provisional scene metadata", and the scene metadata that scene division is fixed is referred to as "fixed scene metadata".

The video transmitting apparatus 101, when sending scene metadata in a state scene division is not fixed, transmits scene metadata to the video receiving apparatus 102 by describing it as provisional scene metadata in the scene fixing information in scene metadata. Then, after scene division is fixed, the video transmitting apparatus 101 again sends the scene metadata fixed in scene division to the video receiving apparatus 102.

FIGS. 8A-8C shows an example of provisional scene metadata and fixed scene metadata. It is herein assumed that the video transmitting apparatus 101 conducts moving-object detection due to video analysis and records, to scene data, the number of moving objects detected in the scene, scene number and scene fixing information.

First, the video transmitting apparatus 101 transmits the scene metadata of a video portion that scene division determination is under progress due to video analysis, i.e. provisional scene metadata. FIG. 8A is an example of provisional scene metadata. In this example, "scene number" is "100", "scene fixing information" is "provisional", and "the number of moving objects" is "0". Also, "time of date/hour of recording end" is a provisional value, "15:02:30".

When the video analyzing process proceeds to detect a moving object in a video image, the video transmitting apparatus 101 carries out scene division at a moving-object detection point as a boundary. It is herein assumed that one moving object is detected in the video image and division into a scene having the number of moving objects of "0" (=fixed scene) and a scene having the number of moving objects of "1" (=provisional scene).

First, the video transmitting apparatus 101 generates fixed scene metadata as in FIG. 8B on the scene having the number of moving objects of "0", and sends it to the video receiving apparatus 102. In the fixed scene metadata, "scene number" is "100", "scene fixing information" is "fixed", "time of date/hour of recording end" is "15:05:00", and "the number of moving objects" is "0".

Subsequently, the video transmitting apparatus 101 generates provisional scene metadata as in FIG. 8C on the video data portion following the fixed scene of FIG. 8B, i.e. video data portion not fixed at its terminal end, and sends it to the video receiving apparatus 102. The provisional scene metadata continues from the fixed scene metadata having "scene number" of "100" sent immediately before, having "scene number" of "101", "scene fixing information" of "provisional", and "the number of moving objects" of "1".

Furthermore, when the scene dividing process proceeds in the video transmitting apparatus 101, the provisional scene corresponding to the provisional scene metadata of FIG. 8C is fixed at its scene terminal end into a fixed scene.

Figure 9:
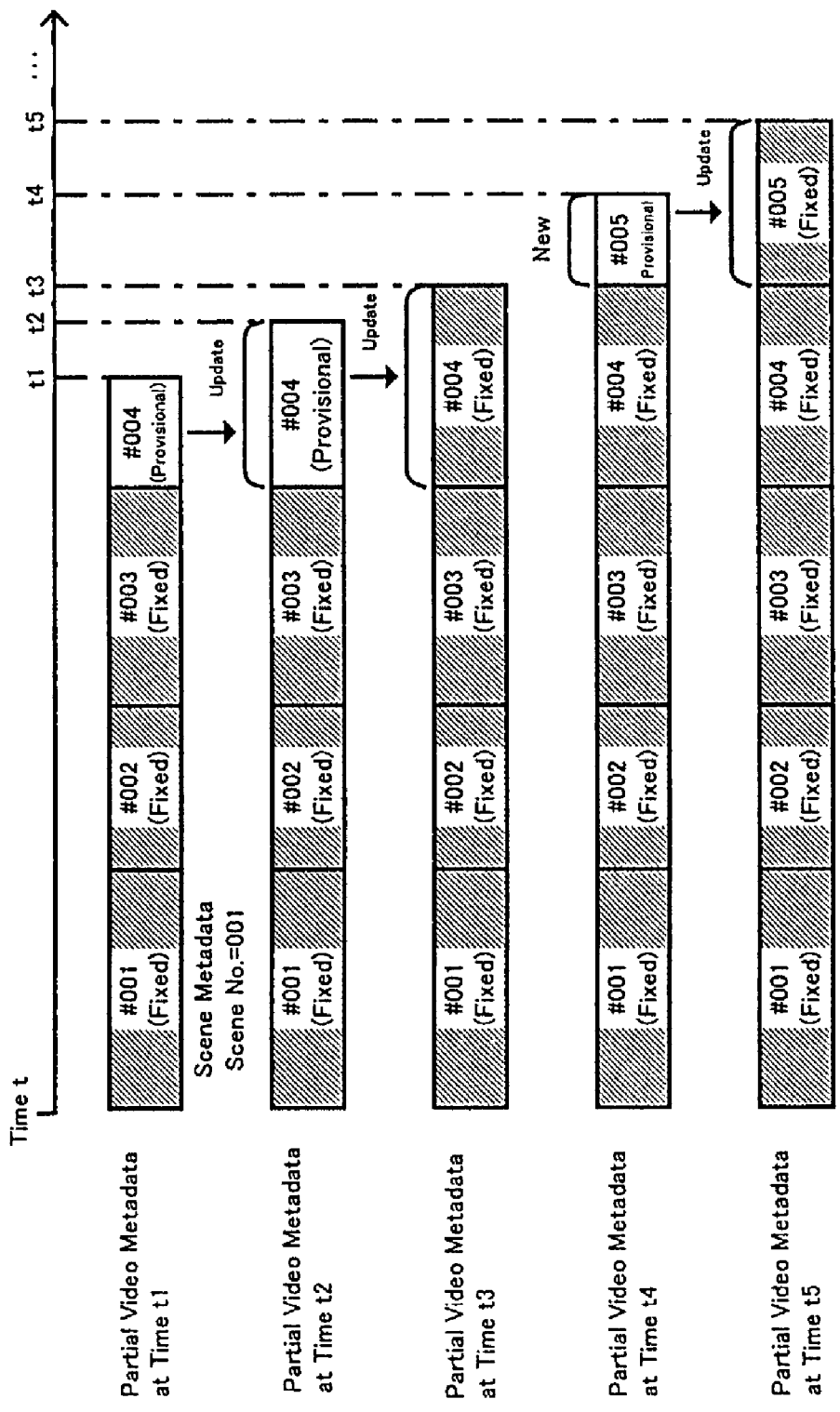
FIG. 9 is a figure explaining provisional scene metadata and fixed scene metadata.

FIG. 9 shows a generation process of partial video metadata in the video receiving apparatus 102. The video receiving apparatus 102 joins the received scene metadata to generate partial video metadata, whereupon provisional scene metadata and fixed scene metadata are discriminated.

Namely, provisional scene metadata is first and foremost provisional. Accordingly, as shown in FIG. 9, when the video receiving apparatus 102 receives the fixed scene metadata having the same scene number as the received provisional scene metadata, it adds the newly received fixed scene metadata to the partial video metadata after discarding the provisional scene metadata.

In this manner, in the video monitoring system of this embodiment, the video transmitting apparatus 101 transmits provisional scene metadata at a predetermined time interval even in a state of unfixed scene division and, after scene division is fixed, carries out again a process to send fixed scene metadata. The video receiving apparatus 102, when connecting the received scene metadata to generate partial video metadata, carries out metadata sending/receiving process wherein provisional scene metadata is properly replaced with fixed scene metadata.

The introduction of fixed/provisional scene metadata to the metadata sending/receiving process broadens a search range of already received data portion of the video data being sent/received in real-time, providing an effect of convenient video data search and improved real-time performance within the video receiving apparatus 102.

Figure 10:
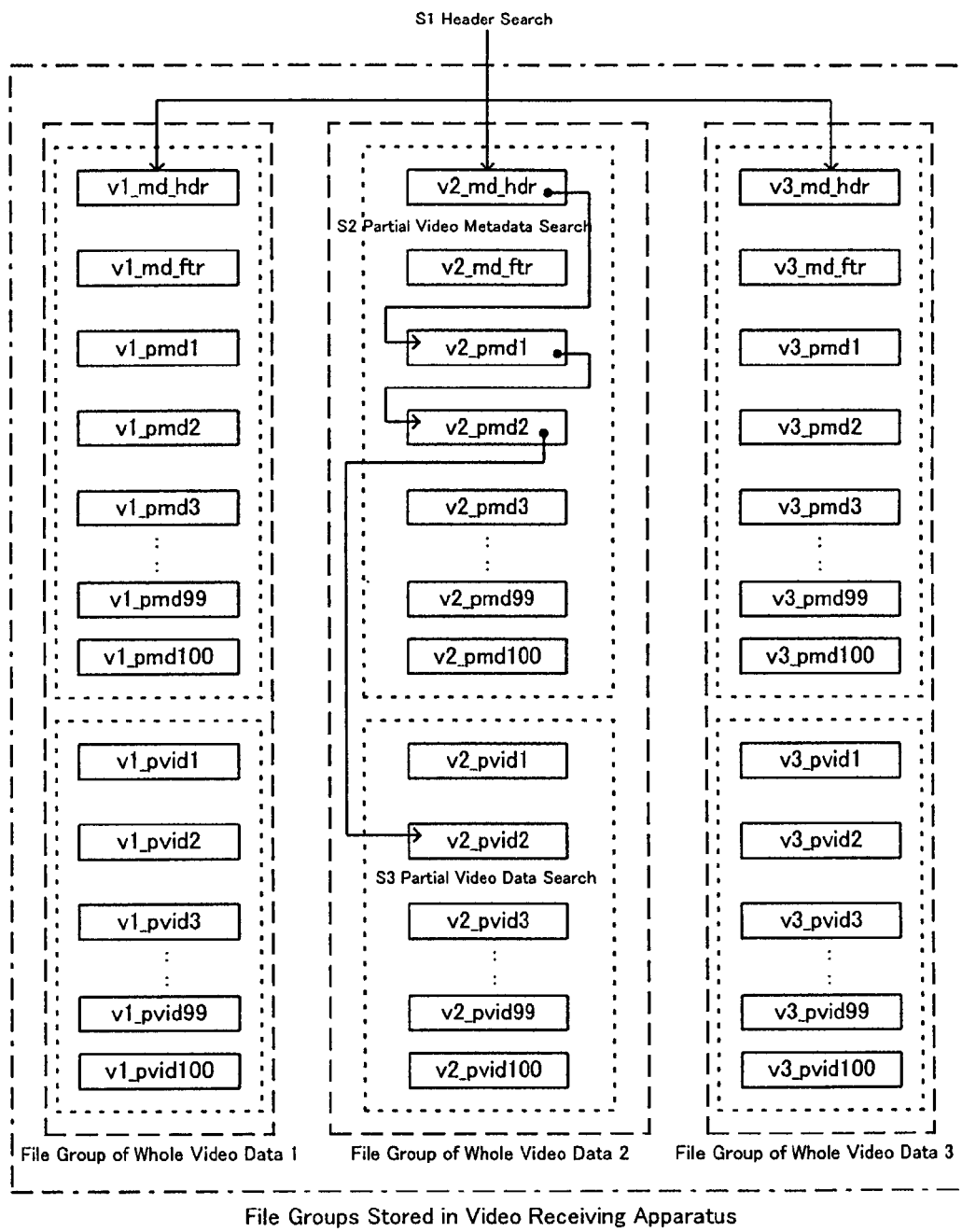
FIG. 10 is a figure explaining a method to make reference to a file during video data search.

Explanation is now made on video data search in the video receiving apparatus 102. FIG. 10 shows how to make reference to a file during video data search in the video receiving apparatus 102. It is herein assumed that displayed is image data recorded in a particular time range of the image data received from a particular video transmitting apparatus 101. In this case, search is made over the header files of the whole video data cumulatively stored in the video receiving apparatus 102 (S1) to specify whole video data as a subject of search. In this header file search, reference is made to terminal-unit individual numbers and recording start time (for recording end time, reference is to the footer files). After specifying a header file of partial video metadata, a file name of the first partial video metadata described in the same is used as a start point to trace partial video metadata files, to specify partial video metadata including a time range as a subject of search (S2). Acquired is a file name of the partial video data described in the selected partial video metadata to access a partial video data file represented by the file name (S3).

By pursuing such a search procedure, it is possible to effectively search for a partial video data file including a desired scene from among a file group of time-continuous video data divided in a plurality of files.

Figure 11:
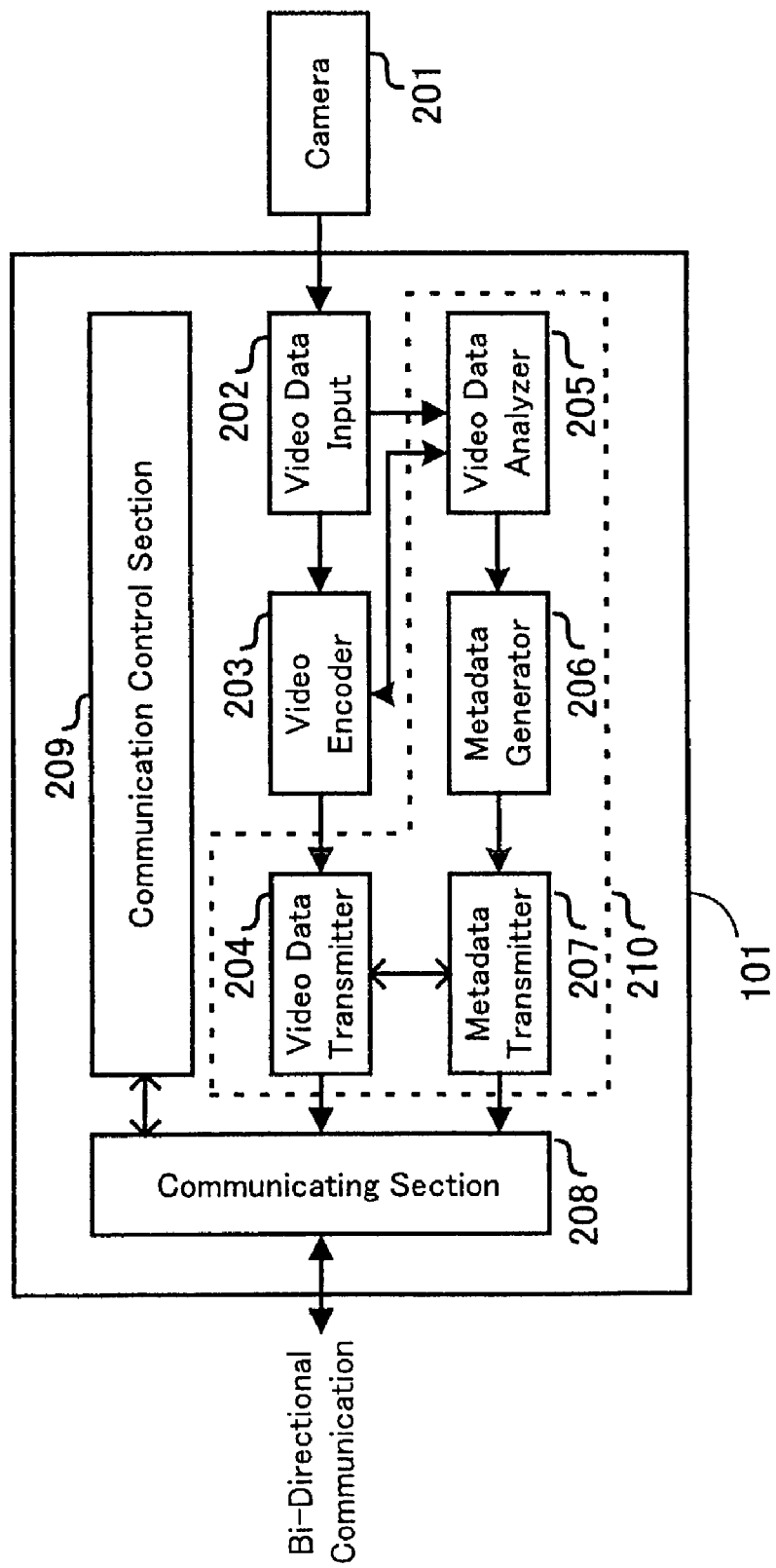
FIG. 11 is a block diagram of a video transmitting apparatus of the video monitor system of FIG. 1.

Explanation is now made on the structure and detailed operation of the video transmitting apparatus 101 and video receiving apparatus 102. FIG. 11 is a block configuration diagram of the video transmitting apparatus 101.

The video data from a video camera 201 is held in an image memory of a video data input section 202. The video data acquired from the video data input section 202 is encoded in a video encoding section 203. The encoded video data, together with various parameters of upon encoding, are outputted to a video data transmitting section 204. The video data transmitting section 204 divides a bit stream of the video data encoded by the video encoding section 203 to a proper size. This is added by a header for data transmission into packet data, which packet data is outputted to a communicating section 208.

On the other hand, a video data analyzing section 205 carries out an arbitrary data analyzing process on the video data held in the video data input section 202, to output a data analysis result to a metadata generating section 206. The metadata generating section 206 shapes the data analysis result outputted by the video data analyzing section 205 into metadata. In a metadata transmitting section 207, the metadata is divided to a proper size. This is added by a header for data transmission into packet data, which packet data is outputted to the communicating section 208. The communicating section 208 forwards the packet data outputted by the video data transmitting section 204 and metadata transmitting section 207 and the packet data for communication control, onto a network. A communication control section 209 carries out communication control with the video data receiving apparatus 102. This also controls the various sections 201-208 of within the video transmitting apparatus 101 and sets various parameters for video encoding.

The video transmitting apparatus 101 may be exclusive hardware as noted before, or configured by a personal computer and peripheral units to realize a part of process over a software program. For example, the region 210 surrounded by the dotted lines in FIG. 11 may be installed with a software program to implement a video transmission process by the use of hardware resources, such as the CPU and memory possessed by the video transmitting apparatus 101. Meanwhile, the video encoding section 203 and communication control section 209 may be installed with a software program.

Figure 12:
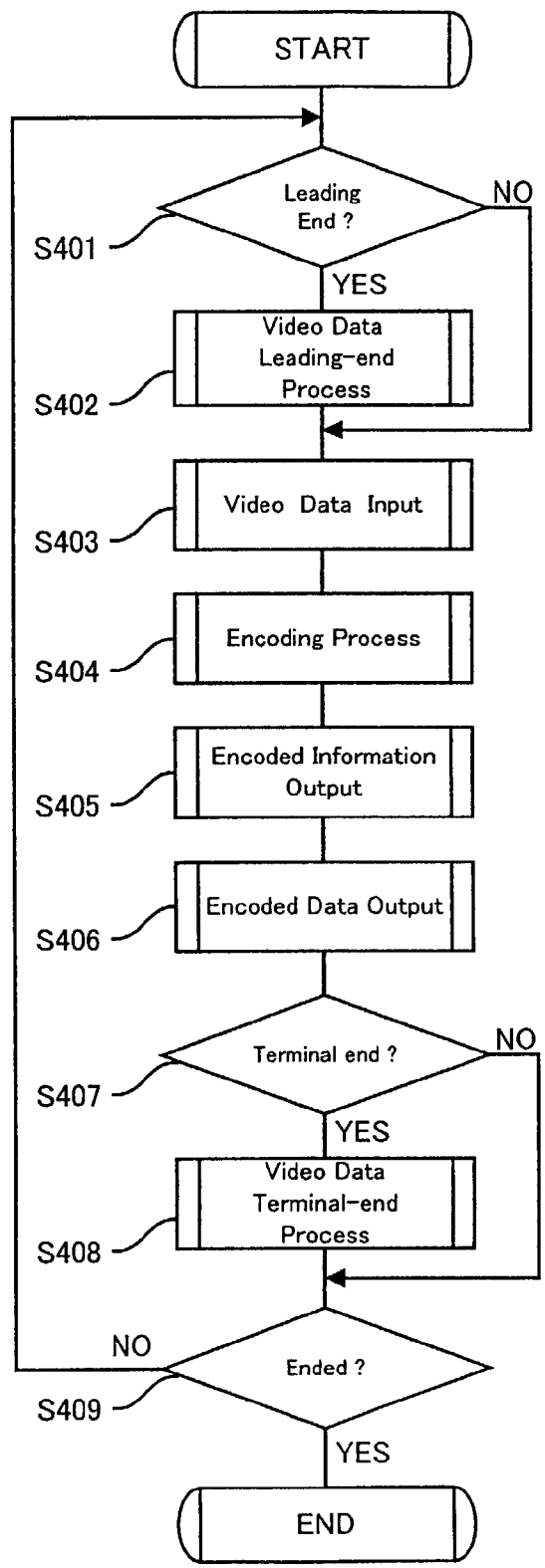
FIG. 12 is a flowchart showing a video data transmitting process procedure in the video transmitting apparatus of FIG. 11.

The operation of the video transmitting apparatus 101 shown in FIG. 11 is now explained by separation with a video data transmitting process and metadata generating process, and a metadata transmitting process. FIG. 12 is a flowchart showing an example of a video data transmitting procedure in the video transmitting apparatus 101.

This flowchart shows a process flow of from inputting video data from the video camera by the video transmitting apparatus 101 to transmitting the video data to the video receiving apparatus 102 via the network.

Step S401 is a process to determine a leading end of video data. The video transmitting apparatus 101 encodes the video data inputted from the video camera to continuously send encoded video data over a long time. Note that the video transmitting apparatus 101 sends video data while partitioning it properly, instead of sending it in one stream-data form.

Namely, the video transmitting apparatus 101 sends video data streams while repeating the start/end of encode process at a predetermined time interval. In step S401, determination is made as to whether encoded video data is to be sent is at a leading end of divided video data or not. In the case of a leading end of video data, the process moves to the next step S402 while, in the case of not a leading end of video data, the process skips over step S402 to step S403.

Step S402 is a leading-end process of video data, to carry out an initializing process concerning a video-data encode process and an output process of a header file of whole video metadata. The header file of whole video metadata is described, as shown in FIG. 6, by link information to partial video data, a terminal-unit identifier specifying a video transmitting apparatus 101 the image data has been imaged, image size, encode scheme kind, recording-start date/hour and so on.

The header file of whole video metadata is generated in the metadata generating section 206 and sent to the video receiving apparatus 102 by way of a metadata transmitting section 207 and communicating section 208. Outputting a header file is not executed every time in step S402 but executed only immediately before sending the partial video data positioned at a leading end of whole video data.

Step 403 is an input process of video data, to input video data at a predetermined frame rate to the video data input section 202 from the video camera 201. The video data input section 202 has an image memory of a double-buffer type so that the image data taken in the image memory can access the video encoding section 203 or video-data analyzing section 205.

Step S404 is an encode process of video data, wherein the video encoding section 203 acquires the image data held in the video-data input section 202 and carries out an encode process on the image data. The video-data encode scheme may be an arbitrary encode scheme of MPEG4, H.263 or the like.

Step S405 is an encoded-information output process, to output various encoding parameters for executing the encode process of step S404 to the video-data analyzing section 205. The various encoding parameters refers to arbitrary information concerning an encode process, such as data length of 1-frame image data, time when an encode process has been done, intermediate information in an encode process (e.g. MPEG4 DCT coefficients or motion vector information).

The reason of outputting these pieces of information to the video data analyzing section 205 is in order to avoid from carrying out data analysis in the video data analyzing section 205 that is similar to the process to be executed in the video encoding section 203. The step S405 is not a requisite process but may be executed limitedly to the case capable of outputting information useful in video data analysis.

Step S406 is an encoded-data output process, wherein the video data encoded in the video encoding section 203 is outputted to the communicating section 208 through the video-data transmitting section 204 and then sent to the video receiving section 102.

Although, as noted before, the video transmitting apparatus 101 carries out transmission in a manner just like continuous one stream of video data without being conscious of leading and terminal ends of partial video data, the same communication channel is used in sending video data. Namely, at each dividing process of video data, partial video data is continuously sent without re-securing a network resource or re-negotiating between the video transmitting apparatus 101 and the video receiving apparatus 102.

Step 407 is a terminal-end determining process to be executed in the video encoding section 203, to determine depending upon a predetermined condition whether to carry out a terminal-end process of partial video data, i.e. a dividing process of video data. For example, a video-data dividing process is carried out at a constant time interval. In the case there is a great change in a video-data analysis result outputted by the video analyzing section 205, determined is to carry out a video-data dividing process. In the case there is no change seen in the video-data analysis result, it is determined not to carry out a video-data dividing process.

In the step S407, when it is determined to carry out a video-data terminal-end process, the process moves to step S408. When it is determined not to carry out a video-data terminal-end process, the process skips step S408 on to step S409.

Step S408 is a video-data terminal-end process, to carry out a process of ending the video-data encode process. The reason of ending once the video-data encode process in the step S408 is in order to start again a video-data encode process at the next frame. Namely, the process of step S408 is a process to divide time-continuous video data into a plurality of partial video data files. Meanwhile, in the step S408 a process to output a footer file of whole video metadata is also carried out.

The footer file of whole video metadata is described by link information to the partial video data positioned at a terminal end of the whole video data, recording-end time and so on, as shown in FIG. 7. Outputting the footer file is not executed every time in step S408, but executed only immediately after sending the partial video data positioned at the terminal end of the whole video data.

Step S409 is an end determining process, to determine whether a predetermined end condition is satisfied or not. In the case of not satisfying an end condition, the process returns to the step S401 to repeat a series of processes. In the case of satisfying an end condition, the video data sending process is ended. Herein, the case an end condition is satisfied corresponds to an interruption in sending video data or shutting down the video transmitting apparatus 101.

As in the above, a series of processes of from the step S401 to step S409 carries out a sending process of image data from the video transmitting apparatus 101 to the video receiving apparatus 102.

Figure 13:
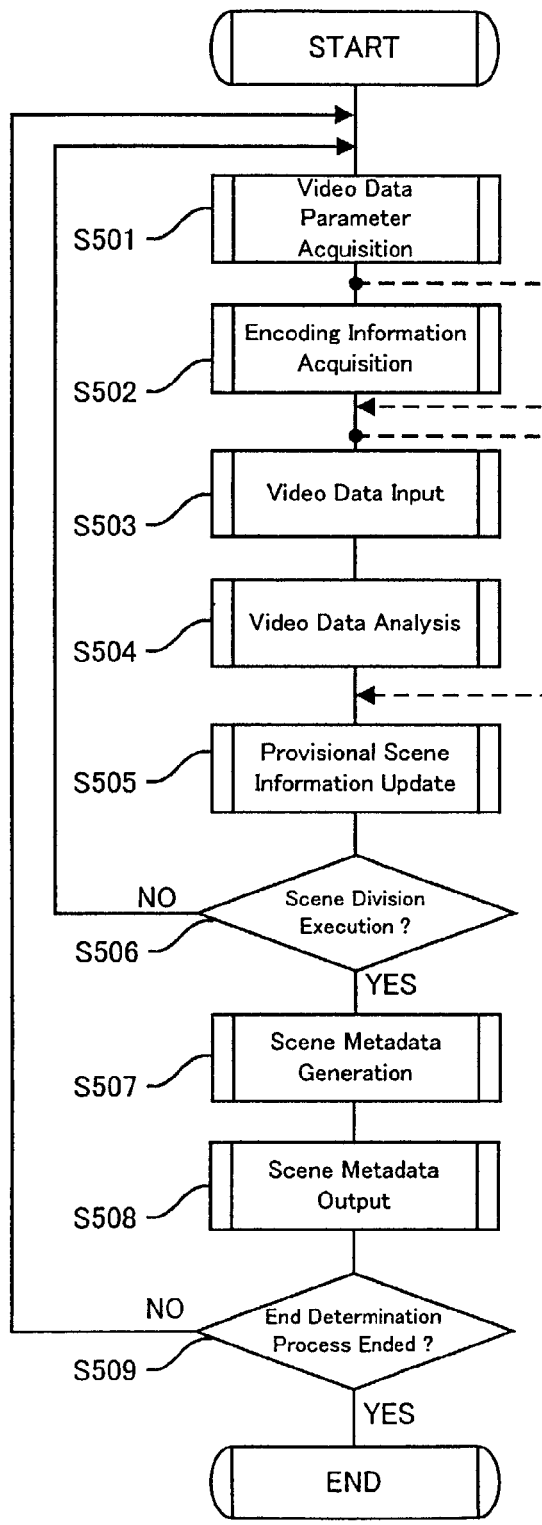
FIG. 13 is a flowchart showing a scene metadata generating process procedure in the video transmitting apparatus of FIG. 11.

FIG. 13 is a flowchart showing an example of a scene metadata generating process procedure in the video transmitting apparatus 101. This flowchart shows a flow of process that a data analyzing process is carried out on the frame image data held in the video-data input section 202 of FIG. 1 to generate scene metadata on the basis of a data analysis result thereof and the encoded information outputted by the video encoding section 203.

Step S501 is a video-data parameter acquiring process to be executed in the video-data analyzing section 205, to acquire various parameters concerning the video data of from the video-data input section 202 or communication control section 209. The examples of acquisition parameters include those of image size (width, height), individual identifier of the video transmitting apparatus 101 and so on.

Step S502 is an encoded-information acquiring process to be executed in the video-data analyzing section 205. Herein, encoded information is the information to be outputted in step S405 of FIG. 12, specifically various parameters related to the video encode process, such as encode scheme kind, 1-frame code amount or intermediate data value in the encode process.

Note that intermediate data in the encode process refers to the information of motion vector amount in each macro-block and DCT (discrete cosine transformation) direct-current segment value where the encode scheme is MPEG4, H.263 or the like.

Step S503 is a video-data input process, wherein the video-data analyzing section 205 acquires the frame image data held in the video-data input section 202. Note that the step S503 may be omitted where video-data analysis can be carried out while properly accessing the frame image data of the video-data input section 202.

Step S504 is a video-data analyzing process to be executed in the video-data analyzing section 205, to conduct data analysis of the frame image data acquired in the step S503. This video-data analyzing process is a process to calculate arbitrary information to be described as metadata. For example, calculated are a value representative of whether there is a moving object in video data or not, the number of moving objects existing in video data, an area of a moving object existing in video data (=ratio of the pixels of a moving object region to all the pixels of frame image data), a value representative of a brightness of video data.

Note that the step S503 uses the encoded information acquired in the step S502. In the case the encoded information acquired in the step S502 is not used, the step S502 can be omitted. Meanwhile, in the case the encoded information acquired in the step S502 can be used, as it is, as a result of video data analysis, the steps S503 and S504 can be omitted.

Step S505 is an update process of provisional scene information to be executed in the video-data analyzing section 205. Provisional scene information is information the data analysis result acquired in step S504 which has been accumulated. Namely, in the step S505, held and updated is a data analysis result of the frame image data whose scene division has not been fixed.

Step S506 is a scene-division determining process to be executed in the video analyzing section 205, wherein the provisional scene information acquired in the step S505 is collated with a predetermined scene-division determining criterion to determine whether or not to carry out scene division. For example, a scene-division determining criterion concerning a fluctuation amount in data analysis result or a continuity in data analysis result is set, to determine, as one scene, a plurality of time-continuous frame image data and having a common term existing in data analysis result. As a specific example, a presence or absence of a moving object in video data is adopted as a scene-division determining criterion to define a part changed in the presence or absence of a moving object in video data as a scene boundary. In case such scene-division determination is made, it is divided into a part having a moving object existing in video and a part not having a moving object existing therein as separate scenes.

In the case determination is made in step S506 to carry out scene division, the process moves to step S507. In the case determination is made not to carry out scene division, the process returns to step S501 to continue a series of processes.

Step S507 is a scene metadata generating process to be executed in the metadata generating section 206, to generate scene metadata corresponding to a video data portion determined as one scene by the scene-division determination of step S506. The scene metadata is described with a video-data analysis result corresponding to that scene, e.g. presence or absence or the number of moving objects in the scene, time information at scene leading and terminal ends, and so on. FIG. 8 shows an example of scene metadata.

Step S508 is a scene-metadata output process, to output the scene metadata generated in the step S507 to the metadata transmitting section 207. The scene metadata outputted to the metadata transmitting section 207 is to be sent to the video receiving apparatus 102 through the communicating section 208, the metadata sending procedure of which will be described later.

Step S509 is an end determining process, to determine whether a predetermined end condition is satisfied or not. In the case the end condition is not satisfied, the process returns to step S501 to repeat a series of processes. In the case the end condition is satisfied, the video-data sending process is ended. Herein, the case an end condition is satisfied corresponds to an interruption of video-data sending or a shut down of the video transmitting apparatus 101.

As in the above, a series of procedures of steps S501 to S509 carries out a scene metadata generating process in the video transmitting apparatus 101.

Figure 14:
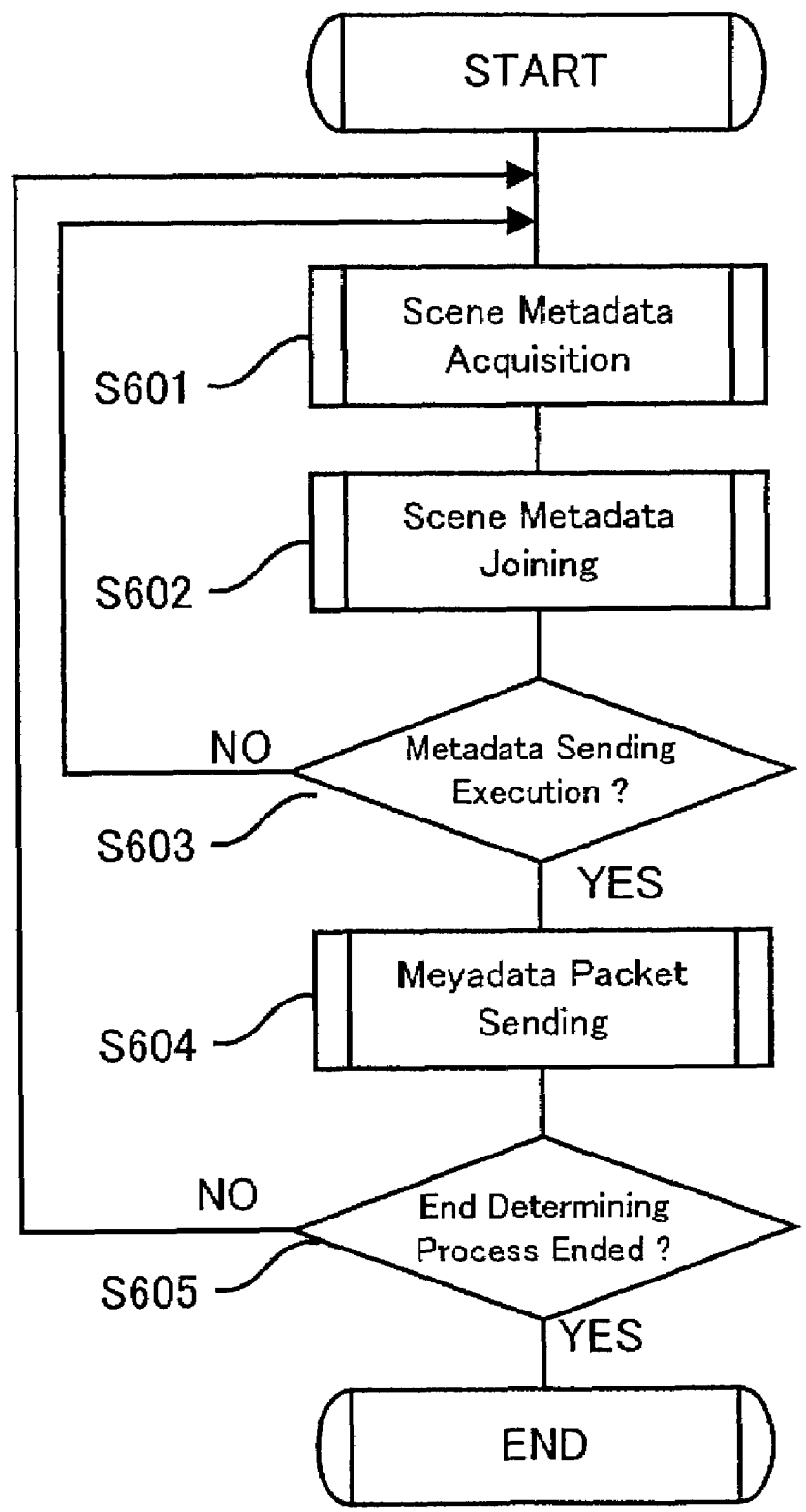
FIG. 14 is a flowchart showing a scene metadata transmission process procedure in the video transmitting apparatus of FIG. 11.

FIG. 14 is a flowchart showing an example of a scene metadata sending process procedure in the video transmitting apparatus 101. This flowchart shows a flow of process that the scene metadata generated in the metadata generating section 206 is shaped into a sending packet and the same packet is sent to the video receiving apparatus 102.

Step S601 is a scene metadata acquiring process to be executed in the metadata transmitting section 207, to acquire the scene metadata outputted from the metadata generating section 206.

Step S602 is a scene metadata joining process to be executed in the metadata transmitting section 207, to join the scene metadata acquired in the step S601 in a chronological order. The reason of chronologically joining scene metadata is because the data size of the individual scene metadata is very small as compared to that of video data. Consequently, a certain number of scene metadata are to be sent collectively in one packet. Incidentally, because scene metadata includes provisional/fixed scene metadata, when connecting the fixed scene metadata having the same scene number as provisional scene metadata, the provisional scene metadata must be deleted.

Step S603 is a metadata-sending determination to be executed in the metadata transmitting section 207, to determine whether to or not to send metadata depending upon a predetermined sending-determining condition. The predetermined sending-determining condition is a condition concerned with sending time and data size. For example, definition is made on a maximum time interval of data sending Tmax and a maximum data length Lmax. In the case the time of from the preceding data sending time Tprev to the current time Tnow exceeds Tmax or the data size L of packet data joining a plurality of scene metadata is greater than Lmax, then determination is made to send metadata. In the case it is determined in the step S603 to send metadata, the process moves to step S604. In the case it is determined not to send metadata, the process returns to the step S601, thus repeating to acquire and join scene metadata.

Step S604 is a metadata packet sending process to be carried out in the metadata transmitting section 207, to send the packet data containing a plurality of scene metadata to the video receiving apparatus 102. In this packet-data sending process, measures of using reliable transport protocol or so should be taken to eliminate missing of packet data reception on the video receiving apparatus 102.

Incidentally, instead of sending one packet data by joining a plurality of scene metadata, sending may be based on each of scene metadata. In this case, the steps S602 and S603 are omitted, and the scene metadata acquired in the step S601 is sent as it is.

Step S605 is an end determining process to be executed in the communication control section 209, to determine whether a predetermined end condition is satisfied or not. In the case the end condition is not fulfilled, the process returns to the step S601 to repeat a series of processes. In the case of fulfilling the end condition, the metadata sending process is ended. Herein, the case an end condition is satisfied corresponds to an interruption of sending video data or a shut down of the video transmitting apparatus 101.

As in the above, a series of procedures of steps S601 to S605 carries out a scene metadata sending process of from the video transmitting apparatus 101 to the video receiving apparatus 102.

Figure 15:
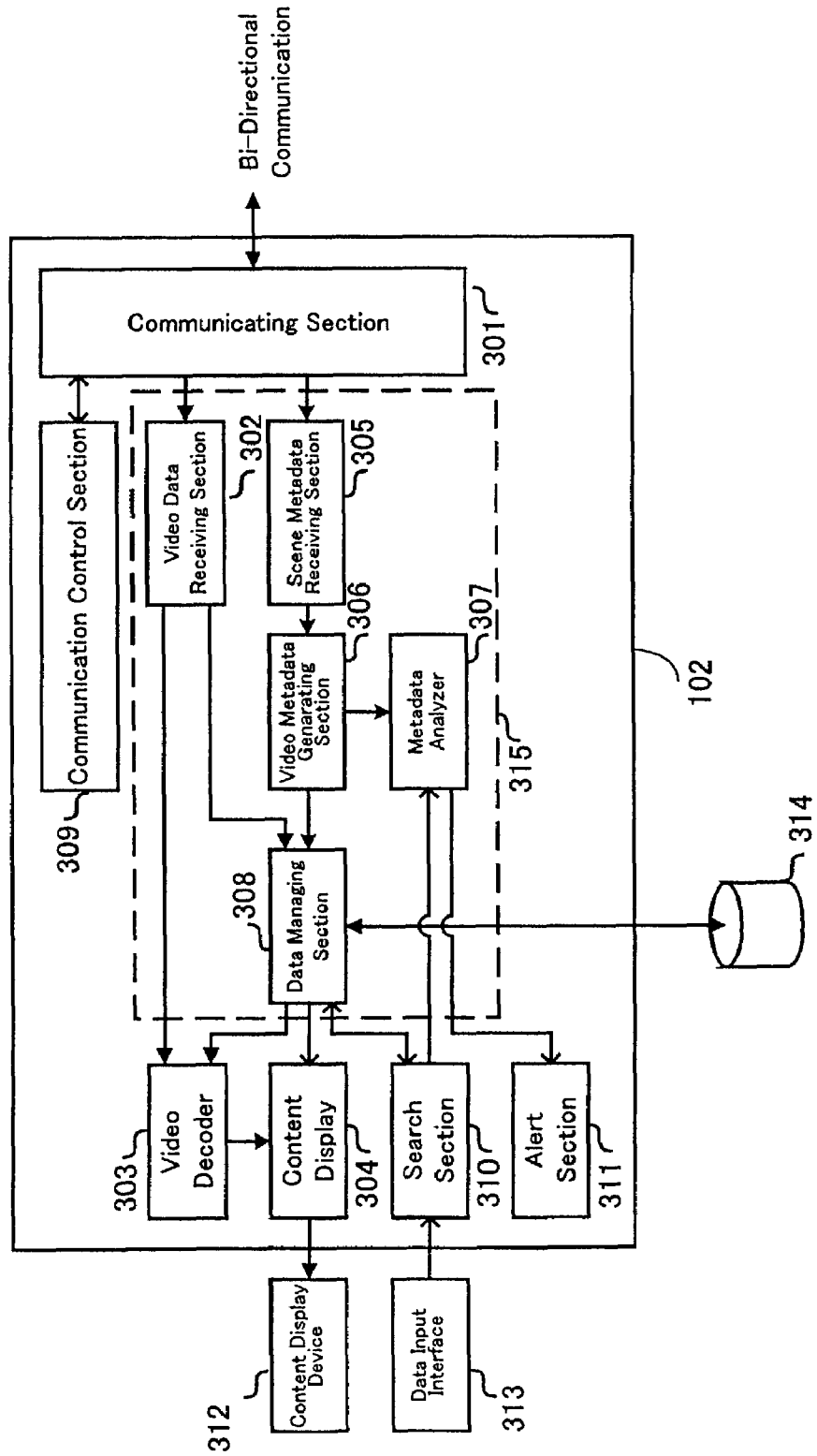
FIG. 15 is a block diagram of a video receiving apparatus of the video monitor system of FIG. 1.

Explanation is now made on the video receiving apparatus 102. FIG. 15 is a block configuration diagram of the video receiving apparatus 102.

A communicating section 301 carries out mutual communications with the video transmitting apparatus 101, to receive video data and metadata thereof sent from the video transmitting apparatus 101. The communicating section 301 receives video data and metadata by using separate channels to output video data to a video data receiving section 302 and metadata to a scene metadata receiving section 305.

The video data receiving section 302 is not especially defined in encode scheme kind of video data. Provided that the video transmitting apparatus 101 and the video receiving apparatus 102 adopt the same encode scheme, an arbitrary encode scheme may be employed.

A video decoding section 303 receives video data from the video data receiving section 302 to carry out a decoding process on the video data. The decoded video data is outputted to a content display section 304. Incidentally, the video decoding section 303 has a capability to decode a whole video data configured with a plurality of partial video data. Namely, the video decoding section 303, when decoding a plurality of time-continuous partial video data files, can process it as a continuous stream data free of discontinuity in time.

The content display section 304 receives decoded video data from the video decoding section 303 to carry out a display process of the video data. The content display section 304 has also a function to convert metadata into a user-readable format. The content display section 304 outputs display-processed video data or metadata to a content display device 312, such as a display.

A scene metadata receiving section 305 receives scene metadata from the communicating section 301. The video transmitting apparatus 101 transmits a packet containing at least one or more of scene metadata. The scene metadata receiving section 305 outputs received scene metadata to a video metadata generating section 306.

The video metadata generating section 306 connects the scene metadata acquired from the scene metadata receiving section 305 to generate partial video metadata. Scene metadata includes fixed scene metadata and provisional scene metadata. In the video metadata generating section 306, the scene metadata sequentially sent from the video transmitting apparatus 101 is connected to form video metadata. However, connection process is separate between fixed scene metadata and provisional scene metadata. Namely, when the video metadata generating section 306 receives fixed scene metadata for replacing the already processed provisional scene metadata, it discards the provisional scene metadata to thereafter connect the fixed scene metadata to the partial video metadata.

A metadata analyzing section 307 analyzes the scene metadata received from the video metadata generating section 306 and determines whether significant information is contained in the scene metadata or not. The scene metadata contains a result of a video analysis conducted in the video transmitting apparatus 101. By making reference to a video analysis result in the scene metadata, it is possible to immediately detect a fact that the video data under reception is in a situation different from that in the usual time. The metadata analyzing section 307, upon detecting scene metadata satisfying a predetermined determining condition, makes a notification to an alert section 311.

Receiving an instruction from the metadata analyzing section 307, the alert section 311 makes an alert process, by arbitrary means, to the user (=video monitoring person) of the video receiving apparatus 102. Herein, the predetermined alert process is, for example, to display the reception video and put on an alarm lamp or to put on an alarm buzzer.

A data managing section 308 carries out processes of storage, search and file management of video data and metadata, i.e. stores the video data outputted from the video-data receiving section 302 to a storage device 314, and reads out the video data stored in the storage device 314. This also carries out processes to store the data being outputted from the video metadata generating section 306 to the storage device 314 and to read out the metadata stored in the storage device 314.

A communication control section 309 carries out communication control with the video transmitting apparatus 101 and control of various sections within the video receiving apparatus 102.

A search section 310 carries out a search process for video data, on the basis of video data already stored in the data managing section 308 and of the video search information that metadata is inputted through a data input interface 313. Video search information will be described later.

A content display device 312 displays in real-time the video data received from the video display section 304 and, besides, is used to display video data stored. The content display device 312 need not be the exclusive hardware for video display, i.e. overlay display may be made on a window screen of a personal computer.

The video receiving apparatus 102 may be of exclusive hardware as noted before, or configured with a personal computer and peripheral units to realize a part of processing over a software program. For example, the block group 315 may be set up as a software program to implement a video reception process by the use of the hardware resources, such as a CPU and a memory, having video receiving apparatus 102. Furthermore, the video decoding section 303, the communication control section 309 and the search section 310 may be set up with a software program.

Explanation is now made on the operation of the video receiving apparatus 102. It is assumed, in the below explanation, that the video receiving apparatus 102 receives video data from one of the video transmitting apparatuses 101a, 101b, 101c. Nevertheless, the video receiving apparatus 102 is allowed to extend its function into a configuration capable of receiving video data from a plurality of video transmitting apparatuses 101a, 101b, 101c.

For example, the video decoding section 303, video display section 304 and display 312 may be prepared the same number as the number of streams of video data to be received, allowing the video-data receiving section 302 and video-data generating section 306 to carry out a data process that can distinguish the video sending source. Otherwise, simultaneous reception of plurality of video data is to be coped with by installing, as a software program compatible with multi-thread, a process to be shouldered by the video-data receiving section 303 and video decoding section 304.

Figure 16:
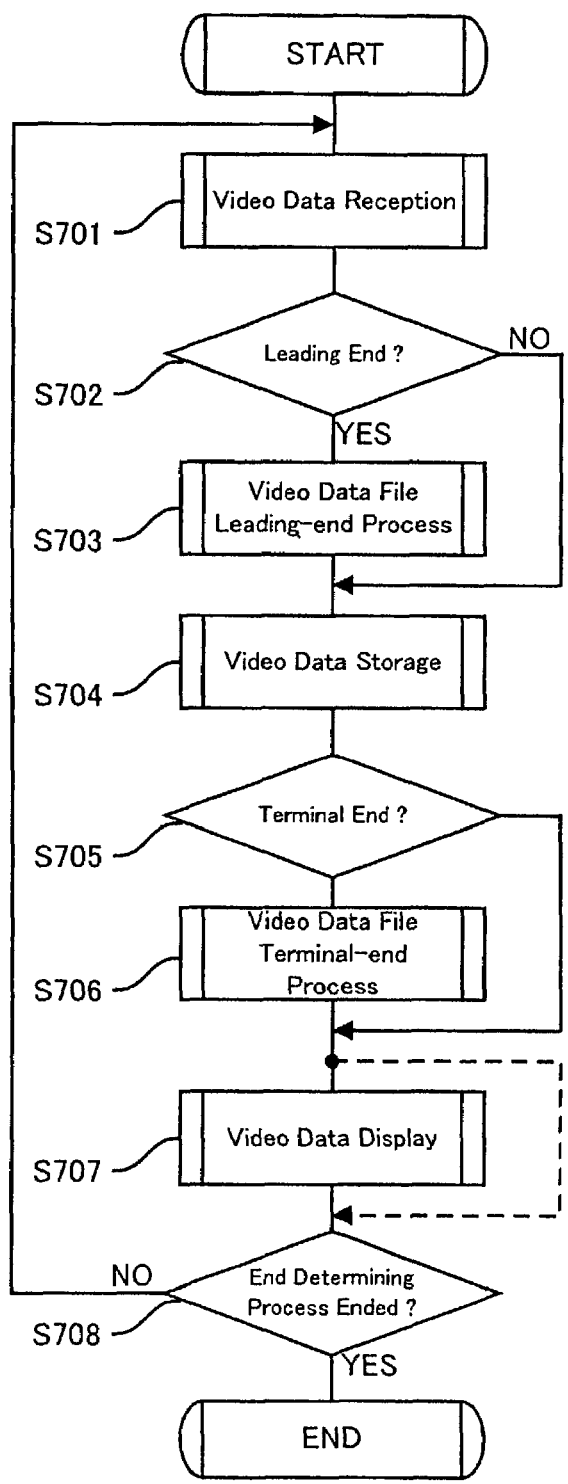
FIG. 16 is a flowchart showing a video data receiving process procedure in the video receiving apparatus of FIG. 15.

FIG. 16 is an example of a flowchart showing a video-data receiving process procedure in the video receiving apparatus 102. This flowchart shows a flow of process that the video receiving apparatus 102 receives video data to display the video data and store it to a database.

Step S701 is a video-data receiving process to receive the video data sent from the video transmitting apparatus 101, which is to be executed in the communicating section 301 and video-data receiving section 302.

Step S702 is a leading-end determining process to be executed in the video-data receiving section 302. As noted before, the video data continuously sent over a long time by the video transmitting apparatus 101 has been divided into partial video data. The video receiving apparatus 102 manages partial video data as separately independent video data files. Herein, "a leading-end of video data" refers to a leading-end of partial video data while "leading-end determining process of video data" refers to a process to detect a leading end of partial video data. For example, for video data under MPEG4 or H.263, a leading end of video data can be detected by detecting a particular bit string, called start code.

After detecting a leading end of partial video data in the step S702, the process moves to step S703. In the other case, the step S703 is skipped.

Step S703 is a leading end process of video data file to be executed in the data managing section 308. The fact a leading end of partial video data has been detected in the preceding step S702 means that reception of one of partial video data has been completed to commence a reception of new partial video data. Step S703 carries out, in the data managing section 308, a process to commence a storage of partial-video data into the database (e.g. opening a video data file). Also, an initialization process is carried out for video-data decoding process, if necessary.

Step S704 is a video-data storage process to be executed in the data managing section 308. In the video receiving apparatus 102, partial video data is managed as separately independent video data files. The video transmitting apparatus 101 transmits partial video data as stream data instead of file transfer as one file in batch. Namely, in the step S701, the data to be received at one time is a part of partial video data. In step S704, partial video data is reconstructed by connecting those of data received in the step S701.

Step S705 is a terminal-end determining process of video data to be executed in the video-data receiving section 302. Step S705 carries out a process to detect a terminal end of partial video data. In the case of detecting a terminal end of partial video data, the process moves to step S706. In the other case, the step S706 is skipped.

Step S706 is a terminal-end process of video data file to be executed in the data managing section 308. In the case of detecting a terminal end of partial video data in the step S705, the data file of partial video data is closed in step S706 to prepare for receiving the next partial video data. Incidentally, in the case that partial video data is in a format not able to detect for its data terminal end, it is possible to carry out a terminal end process on the preceding partial video data during the video-data file leading-end process of step S703.

Step S707 are processes to decode the received video data and to display video data in order for a display process. The step S707 is to be executed in the video decoding section 303, content display section 304 and content display device 312. Where there is no need for video display upon receiving video data, the step S707 may be omitted.

Step S708 is an end determining process to be executed in the communication control section 309, to determine whether a predetermined data reception end condition is satisfied or not. In the case the end condition is not satisfied, the process returns to the step S701 to repeat a series of processes. In the case the end condition is satisfied, the video-data receiving process is ended. Herein, the case an end condition is satisfied corresponds to an interruption of video-data reception or a shut down of the video receiving apparatus 102.

As in the above, a series of procedures of from the step S701 to the step S708 carries out a video-data receiving process in the video receiving apparatus 102.

Figure 17:
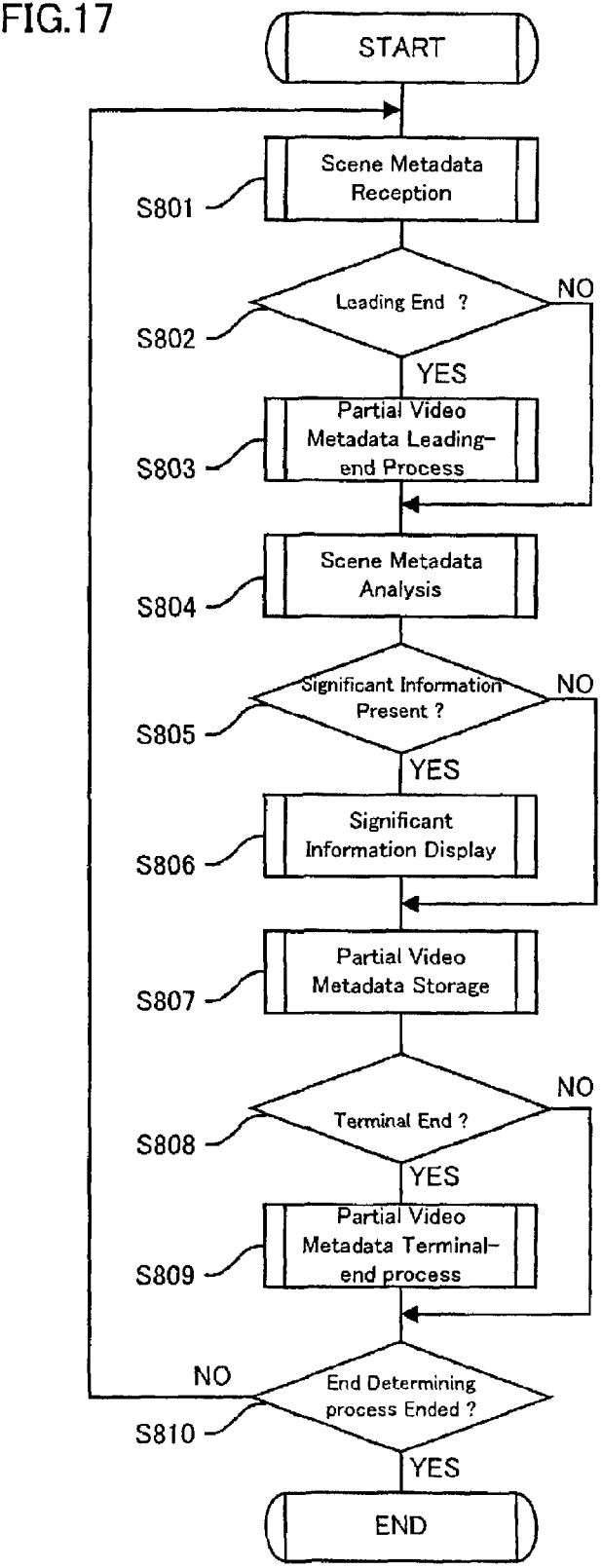
FIG. 17 is a flowchart showing a scene metadata receiving process procedure in the video receiving apparatus of FIG. 15.

FIG. 17 is a flowchart showing an example of a scene metadata receiving process procedure in the video receiving apparatus 102. This flowchart shows a flow of process to connect the scene metadata received from the video transmitting apparatus 101 thereby generating and storing partial video metadata.

Step S801 is a scene metadata receiving process to receive the scene metadata sent by the video transmitting apparatus 101, which is to be executed in the communication section 301 and scene metadata receiving section 305. The video transmitting apparatus 101 sends, as packet data, the metadata in the scene constituting partial video data. The packet data contains at least one or more of scene metadata.

Step S802 is a leading-end determining process of partial video metadata to be executed in the video metadata generating section 306. The video receiving apparatus 102 connects the scene metadata sent by the video transmitting apparatus 101 to generate partial video metadata. Instep S802, it is determined whether the scene metadata as a subject of processing is the scene metadata at a leading end of partial video metadata or not. In the case of scene metadata at a leading end of partial video metadata, the process moves to step S803. In the other case, the process skips step S803 to step S804.

Step S803 is a leading end process of partial video metadata. Each of scene metadata and partial video metadata singly serves as metadata. However, when storing metadata to the database, the partial video metadata having scene metadata connected together is handled as one data file. The fact that a leading end of partial video metadata has been detected in the step S802 means that reception of one of partial video metadata has been completed immediately before to commence a reception of new partial video metadata. At Step S803, in the data managing section 308, a process to commence a storage of new partial video metadata to the database is carried out (e.g. opening a partial video metadata file).

Step S804 is a scene metadata analyzing process to be executed in the metadata analyzing section 307. Scene metadata is metadata corresponding to one scene constituting partial video metadata. This scene metadata contains time information about the scene and information of a video analysis result and the like. The description content of scene metadata relies upon what video analysis is conducted in the video transmitting apparatus 101 and what information is described as metadata. In step S804, content analysis is made for each of scene metadata to present, as required, the information described in the scene metadata to the user of the video receiving apparatus 102 (=video monitoring person).

Step S805 is a significant-information determining process to be executed in the metadata analyzing section 307. Herein, "significance" of significant information changes depending upon a purpose of video monitoring. The present embodiment is on the video monitor system aiming at crime prevention, wherein "significant information" is defined as "video image in a different situation from that of the usual time", specifically "video image in which a moving object exists" and scene metadata contains a result of a moving-object determining process in the video transmitting apparatus 101.

In step S805, read out is a result of a moving-object detecting process described in the scene metadata, to determine whether-a video image including a moving object is under reception or not. In the case it is determined in the step S805 that significant information is included, the process moves to the next step S806. In the case it is determined that significant information is not included, the process skips step S806 jumping to step S807.

Incidentally, in executing the step S805, there is a need to previously define as to what "significant information" means. The "setting of significant information" is conveyed to the metadata analysis section 307 through the data-input interface 313 and search section 310.

Step S806 is a display process of significant information. In the case of a detection in the step S805 that significant information is contained in scene metadata, this is displayed to make a notification to the video monitoring person. Where the video data under reception is not displayed, the video data stored in the storage device 314 is read out and displayed starting at a scene including significant information. Simultaneously with this, an alarm lamp is put on or an alert sound is outputted to alert the video monitoring person of an occurrence of abnormality. The step S806 is to be executed by the metadata analysis section 307, content display section 304, alert section 311 and content display device 312.

Step S807 is a partial-video-metadata storage process to be executed in the data managing section 308. In this step, newly received scene metadata is additionally written onto the partial video metadata already stored in the storage device 314. There is no need to carry out an actual process of additionally writing scene metadata each time scene metadata is received, i.e. a certain number of scene metadata may be held in the data managing-section 308 so that these can be additionally written in batch.

Meanwhile, upon additionally writing scene metadata, a process is carried out with a distinction between fixed scene metadata and provisional scene metadata. Namely, in the storage process of partial video metadata in the step S807, when detecting fixed scene metadata having the same scene number as provisional scene metadata, the fixed scene metadata is additionally written after dumping the provisional scene metadata. Incidentally, the provisional scene metadata may be held in the data managing section 308 without being stored to the storage device 314, thereby carrying out a replacement process with the fixed scene metadata.

Step S808 is a terminal-end determining process of partial video metadata to be executed in the metadata generating section 306, to determine whether the scene metadata as a subject of processing is scene metadata at a terminal end of partial video metadata. In the case it is at a terminal end of partial video metadata, the process moves to step S809. In the case it is not at a terminal end of partial video metadata, the process skips step S809 to step S810.

Step S809 is a terminal-end process of partial video metadata to be executed in the data managing section 308. In the case of detecting a terminal end of video metadata in the step S808, the data file of partial video metadata is closed to prepare for receiving the next partial video metadata.

Step S810 is an end determining process to be executed in the communication control section 309, to determine whether a predetermined end condition is satisfied or not. In the case it is not satisfying the end condition, the process returns to the step S801 to repeat a series of processes. In the case of satisfying the end condition, the video data receiving process is ended. Herein, the case of satisfying an end condition corresponds to an interruption of video-data reception or a shut down of the video receiving apparatus 102.

As in the above, a series of the procedures of from step S801 to the step S810 carries out a scene metadata receiving process in the video receiving apparatus 102.

Incidentally, the video transmitting apparatus 101 transmits header/footer files of whole video metadata, besides partial video data and scene metadata, to the video receiving apparatus 102. The header/footer files are satisfactorily stored as respective independent data files in the video receiving apparatus 102, and hence the explanation on reception process procedure is omitted.

Figure 18:
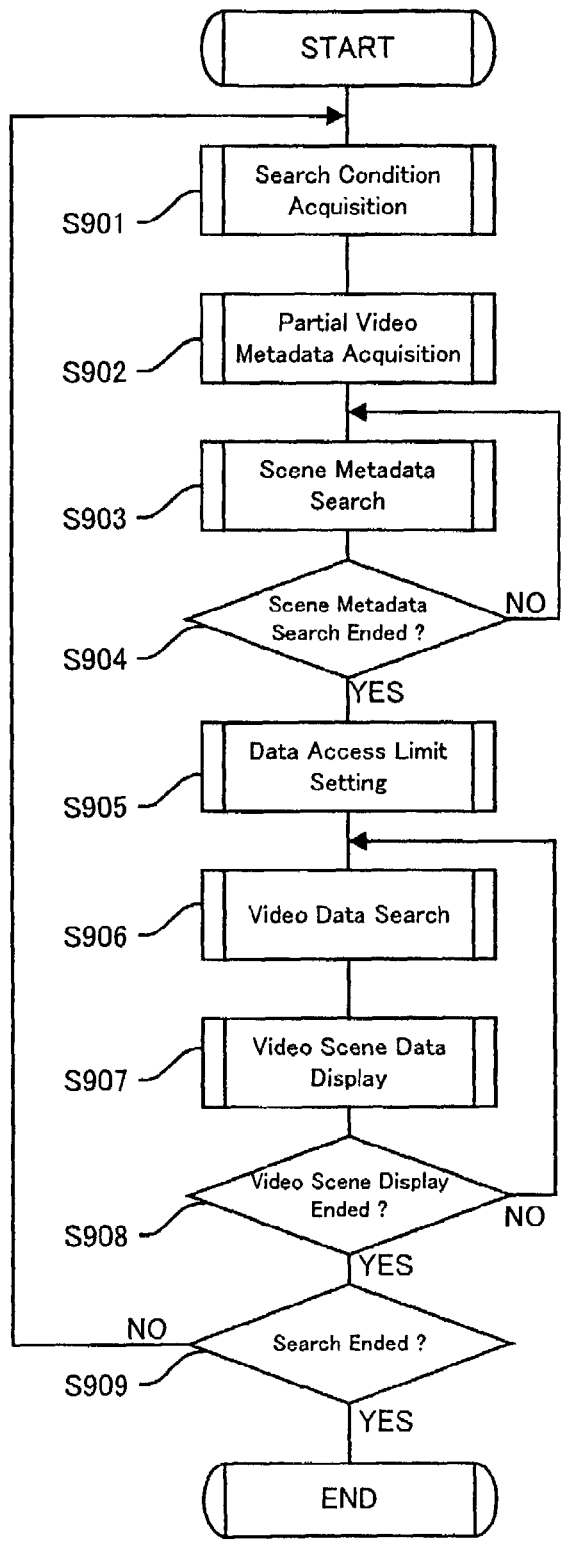
FIG. 18 is a flowchart showing a data search process procedure in the video receiving apparatus of FIG. 15.

FIG. 18 is an example of a flowchart showing a data search process procedure in the video receiving apparatus 102. This flowchart shows a flow of process, in the video receiving apparatus 102, to read out partial video data satisfying a search condition presented by the user and decode/display the video scene contained in the partial video data.

Step S901 is a search condition acquiring process to be executed in the data input interface 313, wherein the video search information for search for video data inputted from the data input interface 313 is acquired and acquired information is outputted to the search section 310. As a video search condition is set the information described in the video metadata, e.g. video-recorded time, video-recorded site (individual identifier specifying the video transmitting apparatus 101) and conditions concerning video analysis result.

Step S902 is a partial video metadata acquiring process to be executed in the data managing section 308. Partial video metadata is a part of whole video metadata, and each of partial video metadata is described with link information to the preceding and succeeding partial video metadata and link information to the partial video data. Meanwhile, there are header and footer files existing in the whole video metadata connecting partial video metadata. FIG. 3 shows a relationship between these data files.

First, search is made through the header files of all of the video image data stored in the storage device 314, to single out a header file satisfying the search condition acquired in the step S901. Because this header file describes link information to the partial video metadata file positioned at a leading end of whole video metadata, reference is made to this to successively trace partial video metadata. When finding partial video metadata satisfying the search condition, the partial video metadata is held in the data managing section 308.

Step S903 is a scene metadata search process to be executed in the search section 310, data managing section 308 and storage device 311. In this step, the partial video metadata read out of the storage device 314 is analyzed to specify scene metadata satisfying the search condition acquired in the step S901. Because this scene metadata describes information about a time range of partial video data, this is held as video scene information. Also, because the partial video metadata describes a file name of the partial video data corresponding to that partial video metadata, this file name is also acquired in the step S903.

Step S904 is a end determining process of scene metadata search to be executed in the data managing section 308. There is a case, in a scene metadata search process, that detected are a plurality of scene metadata and not only one scene metadata. This is true for such a case as to search a video scene having a certain degree of time range. In step S904, determination is made as to whether or not all of scene metadata have been acquired that satisfy the search condition acquired in the step S901. In the case all of the scene metadata has been acquired to end the scene metadata search, the process moves to step S905. In the case there is left a scene metadata satisfying the search condition, the process returns to step S903 to carry out the next search process for scene metadata.

Step S905 is a limit setting process of data access to be executed in the data managing section 308. The scene metadata in partial video metadata contains scene fixing information representative of a kind of scene metadata. In the case the partial video data as a subject of search is in a reception process, the partial video data is not fixed in its file terminal end. Namely, the scene metadata at the terminal end of the partial video metadata is provisional scene metadata. In step S905, by making reference to scene fixing information of each of scene metadata, confirmation is made whether the partial video metadata detected in the step S902 contains provisional scene metadata or not. In the case of containing provisional scene-metadata, set is a data access limitation to partial video data. Specifically, restriction is given not to have a data access to a video scene in a position rear to a video scene corresponding to the provisional scene metadata when video data is searched/displayed.

Explanation is made on a reason for setting a data access limitation, in the below. The fact that partial video metadata has provisional scene metadata at its terminal end as in the above means that the partial video metadata is in a reception/storage process. Namely, even during a search process for partial video data, in progress is additional writing of data to the partial video data file as a subject of search. Should a permission for free search/display is given to the partial video data file, a data region positioned rear to a video scene corresponding to the provisional scene metadata is accessed, resulting in a fear to cause a hindrance to the video data reception process (=additional data writing to the partial video data file) and damage the data file. To avoid this, provided is such data access limitation as in the above. Incidentally, in the case that separately provided is a means for prohibiting such data access which damage a video data file, the step S905 may be omitted. Meanwhile, where the subject of search is a partial video data already stored, the step S905 is unnecessary.

Step S906 is a search process of video data to be executed in the search section 310. This search process of video data uses the partial video metadata searched in the step S902. The partial video metadata contains link information to partial video data. By making reference to the link information, access is made to a partial video data file to find a scene portion corresponding to the scene metadata searched in the step S903 from the partial video data. The detected video scene data is outputted to the video decoding section 303 through the data managing section 308. Incidentally, in the step S905, the scene set with an access limitation is excluded out of a subject of search.

Step S907 is a video scene data displaying process to be executed in the video decoding section 303. The video scene data to be displayed in the step S907 is the video scene data searched in the step S906. The video decoding section 303 decodes scene data of the video data received from the data managing section 308. The decoded video data is displayed on the content display device 312 through the content display section 304. Meanwhile, the information, described in the scene metadata corresponding to a decoded/displayed video scene, may be displayed on the content display device 312.

Step S908 is an end determining process of video scene display to be executed in the search section 310. As noted before, there is a case that a plurality of scenes are searched in the scene metadata search of step S903. Accordingly, in order to display the searched ones of scene data, scene data of video data must be read out and decoded/displayed in times of the number of the scenes. In the step S908, determination is made whether the searched scenes have been all displayed or not. In the case that scene display has been completed, the process moves to the next step S909. In the case that scene display has not been completed, the process returns to the step S906 to repeat to decode/display the remaining scenes.

Incidentally, in the step S908, a person who is searching video data may reset a scene-displaying section of partial video data to freely play-control the partial video data. This is one function required on the video monitor system that repeatedly displays a searched video scene including the preceding and succeeding scenes to the searched video image. In this case, play control means having functions such as playback, stop, fast-forward, rewind and slow playback, is provided to the data input interface 313 or search section 310 to convey a play control command of from the user to the data managing section 308 whereby play control of partial video data is carried out in a control loop of from the step S906 to the step S908. However, in the case that an access limitation is set to partial video data, play control is allowed limitedly to those obeying the access limitation.

Step S909 is a search-end determining process to be executed in the search section 310. When there is an instruction from the user to end the search, the search process is ended. When there is no instruction from the user to end the search, the process returns to the step S901 to repeat a series of processes.

As in the above, a series of procedures of from the step S901 to the step S909 carries out a search process of video data in the video receiving apparatus 102.

Incidentally, search for whole image data, or search for video data over a plurality of partial video data, can be easily realized if using link information between those of partial video metadata, and hence explanation is omitted.

As in the above, according to the present invention, in the case of continuously sending video data for a long time, whole video data is transmitted while being segmented at a predetermined time interval into a plurality of partial video data. Consequently, the reception-sided system is allowed to easily store long video data by dividing it into a plurality of partial video data files without conducting complicated video data analysis. This, accordingly, makes it easy to manage the data files of video data. Meanwhile, in concurrent with sending video data, sent is partial video metadata corresponding to partial video data. Consequently, the reception-sided system can search over already-received partial video data of the whole video data being in a reception process, by the utilization of only already-received metadata.

Meanwhile, the link information described in partial video metadata defines a logical sequential relationship between those of partial metadata as well as a corresponding relationship between partial video metadata and partial video data. Accordingly, in the reception-sided system, a plurality of partial video metadata can be connected to reconstruct one whole video metadata. This can be utilized in a search process of whole video data.

Meanwhile, whole video metadata is added by a header file having link information to the partial video metadata at a leading end and a footer file having link information to the partial video metadata at a terminal end. Consequently, in the reception-sided system, whole video metadata can be searched for by sequentially tracing partial video metadata starting at a header or footer file of whole video metadata.

Meanwhile, partial video data is segmented into scene data and partial video metadata, also, is into scene metadata. This improves the convenience in a video data search utilizing metadata, making possible to efficiently find a desired video scene.

Also, metadata sending is carried out based on each of scene metadata, as reference, constituting partial video metadata. Accordingly, even in a state where video data transmission/reception is in progress, video data search using scene metadata can be effected for the video scenes already received in the reception-sided system.

Meanwhile, because the video data portions having similarity in video analysis result is gathered into one scene to write a video analysis result corresponding to the scene onto each of scene metadata, it is possible to efficiently carry out a video search process using, as a search key, the video analysis result, or feature amount of video data.

Also, because provisional scene metadata can be sent even in a state there is no change in video analysis result, it is possible to improve the immediateness in utilizing scene metadata of video data in the reception-sided system.

What is claimed is:

1. A method of transmitting video data input as stream data in real-time, comprising:
    a video encoding process step of encoding the video data by: 1) dividing the stream data at predetermined points in time into a plurality of time-continuous video data, each of the plurality of time-continuous video data being different from each other, 2) performing an encoding process on each of the time-continuous video data to generate a respective plurality of encoded video data that form partial video data and 3) sequentially outputting the partial video data;
    a video data transmitting step of sending the partial video data in real-time;
    a metadata generating step of generating respective metadata of each of the partial video data to provide partial video metadata; and
    a metadata transmitting step of sending the partial video metadata,
    wherein the metadata generating step includes a step of managing a plurality of the partial video metadata having a time-continuous relationship as whole video metadata and outputting the respective partial video metadata including, at least, an identifier of the partial video metadata, link information to preceding and succeeding partial video metadata having the time-continuous relationship and link information to the respective partial video data.

2. A method of transmitting video data according to claim 1, further including a step of outputting a header file including the link information to the partial video metadata at a leading end prior to outputting the partial video metadata positioned at the leading end of the whole video metadata, and outputting a footer file including the link information to the partial video metadata at the terminal end after outputting the partial video metadata positioned at the terminal end of the whole video metadata.

3. A method of transmitting video data according to claim 1, further comprising a video analyzing process step of carrying out a video analyzing process of the video data and outputting a video analysis result at the predetermined time interval, and a scene dividing process step of carrying out a scene dividing process on the partial video data on the basis of a predetermined scene dividing condition and outputting a scene dividing result, wherein the metadata generating step includes a step of generating the respective metadata based on a scene of the partial video data, on the basis of the scene dividing result, and outputting respective scene metadata having the metadata describing the video analysis result.

4. A method of transmitting video data according to claim 3, wherein the metadata transmitting step includes a step of dividing the partial video metadata into the respective scene metadata for handling and sending the scene metadata.

5. A method of transmitting video data according to claim 4, wherein the process of dividing the partial video metadata into the scene metadata sets, as the predetermined scene dividing condition, a condition to determine a similarity of the video analysis result to be outputted at the predetermined time interval, and determines video data portions having similar video analysis results and a time-continuous relationship as one scene, whereby a video data portion that is not similar in the video analysis result is determined as a scene boundary, thereby carrying out the scene dividing process.

6. A method of transmitting video data according to claim 3, wherein the video analyzing process step includes a step of detecting a moving object in a video image of the video data and outputting a detection result of the moving object including a feature amount of the detected moving object, the scene dividing process step including a step of setting a presence or absence of the moving object as the predetermined scene dividing condition by the detection result of the moving object and carrying out the scene dividing process to divide between a video data portion not including the moving object and a video data portion including the moving object, the metadata generating step including a step of describing a numerical representative of the presence or the absence of the moving object detection in the scene metadata.

7. A method of transmitting video data according to claim 5, wherein the scene dividing process step includes a step of outputting a provisional scene dividing process result in a case a predetermined time elapses from carrying out a preceding scene dividing process and periodically repeating to output the provisional scene dividing process result until a regular scene dividing process is executed, on the basis of the scene dividing condition.

8. A method of transmitting video data according to claim 6, wherein the scene dividing process step includes a step of outputting a provisional scene dividing process result in a case a predetermined time elapses from carrying out a preceding scene dividing process and periodically repeating to output the provisional scene dividing process result until a regular scene dividing process is executed on the basis of the scene dividing condition, the metadata generating step including steps of handling the scene metadata corresponding to a scene generated by the provisional scene dividing process as provisional scene metadata, and handling the scene metadata corresponding to a scene generated by a fixed scene dividing process as fixed scene metadata, the scene metadata including at least scene fixing information to distinguish between two kinds of scene metadata, scene numbers to be assigned to all scenes included in the whole video data, recorded date information representative of a scene-recording start date and an end date and the video analysis result.

9. A method of receiving video data comprising:
    a video data receiving step of receiving the whole video data being sent by the method according to claim 8;
    a video data storage step of separating the whole video data into a plurality of partial video data to be respectively stored as independent data files to a storage medium;
    a metadata receiving step of receiving whole video metadata; and
    a metadata storage step of separating the whole video metadata into a header file, a plurality of partial video metadata and a footer file that are to be respectively stored as further independent data files to the storage medium.

10. A method of receiving video data according to claim 9, wherein the metadata receiving step includes a step of receiving scene metadata respectfully associated with the partial video metadata, the metadata storage step including a step of storing the partial video metadata reconstructed by connecting the scene metadata belonging to the partial video metadata into a memory.

11. A method of receiving video data according to claim 9, wherein the metadata storage step distinguishes between provisional scene metadata and fixed scene metadata on the basis of scene fixing information of the scene metadata, and in the case of receiving the fixed scene metadata having a same scene number as the provisional metadata already written onto the partial video metadata, the fixed scene metadata is additionally written after deleting the provisional scene metadata from the partial video metadata.

12. A computer readable medium encoded with a video data transmitting program for a computer to execute a data process based on a video data transmitting method comprising:
   a video encoding process step of encoding video data input as stream data by: 1) dividing the stream data at predetermined points in time into a plurality of time continuous video data, each of the plurality of time-continuous video data being different from each other, 2) performing an encoding process on each of the time-continuous video data to generate a respective plurality of encoded video data that form partial video data and 3) sequentially outputting the partial video data;
   a video data transmitting step of sending the partial video data in real-time;
   a metadata generating step of generating respective metadata of each of the partial video data and to provide partial video metadata; and
   a metadata transmitting step of sending the partial video metadata,
   wherein the metadata generating step includes a step of managing a plurality of the partial video metadata having a time-continuous relationship as whole video metadata, and outputting the respective partial video metadata including, at least, an identifier of the partial video metadata, link information to preceding and succeeding partial video metadata having the time-continuous relationship and link information to the respective partial video data.

13. A computer readable medium according to claim 12, further comprising a scene dividing process step of carrying out a scene dividing process on the partial video data on the basis of a predetermined scene division determining condition and outputting a scene division result, the scene dividing process step including a step of outputting the provisional scene dividing process result in a case a predetermined time elapses from carrying out a preceding scene dividing process and periodically repeating to output the provisional scene dividing process result until a regular scene dividing process is executed on the basis of the scene dividing condition, the metadata generating step including steps of handling scene metadata corresponding to a scene generated by the provisional scene dividing process as provisional scene metadata, and handling scene metadata corresponding to a scene generated by a fixed scene dividing process as fixed scene metadata.

14. A computer readable medium encoded with a video data receiving program for a computer to execute a data process based on a video data receiving method, said method comprising the steps of:
   receiving whole video data being sent by the method of encoding the video data input as stream data by: 1) dividing the stream data at a predetermined points in time into a plurality of time continuous video data, each of the plurality of time-continuous video data being different from each other, 2) performing an encoding process on each of the time-continuous video data to generate a respective plurality of encoded video data that form partial video data and 3) sequentially outputting the partial video data;
   sending the partial video data in real-time,
   generating respective metadata of each of the partial video data to provide partial video metadata; and
   sending the partial video metadata;
   a video data storage step of separating the whole video data into a plurality of the partial video data that are to be, respectively, stored as independent data files to a storage medium;
   a metadata receiving step of receiving whole video metadata associated with a plurality of the partial video metadata; and
   a metadata storage step of separating the whole video metadata into a header file, the plurality of the partial video metadata and a footer file that are to be respectively stored as further independent data files to the storage medium,
   wherein the metadata generating step includes a step of managing a plurality of the partial video metadata having a time-continuous relationship as whole video metadata and outputting the respective partial video metadata including, at least, an identifier of the partial video metadata, link information to preceding and succeeding partial video metadata having the time-continuous relationship and link information to the respective partial video data.

15. A video transmitting apparatus for transmitting video data in real-time, comprising:
   program executing means for executing a video data transmitting program for a computer to execute a data process based on a video data transmitting method comprising:
   a video encoding process step of encoding the video data input as stream data by: 1) dividing the stream data at predetermined points in time into a plurality of time continuous video data, each of the plurality of time-continuous video data being different from each other, 2) performing an encoding process on each of the time-continuous video data to generate a respective plurality of encoded video data that form partial video data and 3) sequentially outputting the partial video data;
   a video data transmitting step of sending the partial video data in real-time;
   a metadata generating step of generating respective metadata of each of the partial video data to provide partial video metadata; and
   a metadata transmitting step of sending the partial video metadata;
   video data input means for inputting the video data acquired from a video camera to the video data transmitting program; and
   communication interface means for transmitting the video data and the metadata of the video data,
   wherein the metadata generating step includes a step of managing a plurality of the partial video metadata having a time-continuous relationship as whole video metadata, and outputting the respective partial video metadata including, at least, an identifier of the partial video metadata, link information to preceding and succeeding partial video metadata having the time-continuous relationship and link information to the respective partial video data.

16. A video receiving apparatus comprising:

program executing means for executing a video data receiving program for a computer to execute a data process based on a video data receiving method, said method comprising the steps of:

receiving whole video data being sent by the method of encoding the video data input as stream data by: 1) dividing the stream data at predetermined points in time into a plurality of time continuous video data, each of the plurality of time-continuous video data being different from each other, 2) performing an encoding process on each of the time-continuous video data to generate a respective plurality of encoded video data that form partial video data and 3) sequentially outputting the partial video data;

sending the partial video data real-time;

generating respective metadata of each of the partial video data to provide partial video metadata; and sending the partial video metadata;

a video data storage step of separating the whole video data into a plurality of the partial video data that are to be, respectively, stored as independent data files to a storage medium;

a metadata receiving step of receiving whole video metadata associated with a plurality of the partial video metadata; and a metadata storage step of separating the whole video metadata into a header file, the plurality of the partial video metadata and a footer file that are to be respectively stored as further independent data files to the storage medium;

program executing means for executing a video data displaying program for a computer to execute a data process based on a method of displaying received video data, comprising:

a search condition setting step of setting a search condition for the video data;

a partial video metadata search step of analyzing the whole video metadata already stored or in a progress of storage on the basis of the search condition and detecting the partial video metadata satisfying the search condition;

a scene metadata search step of analyzing the detected partial video metadata and detecting scene metadata satisfying the search condition;

a partial video data search step of detecting the partial video data corresponding to the searched partial video metadata; and a partial video data displaying step of displaying a scene of the partial video data corresponding to the searched scene metadata;

communication interface means for receiving the video data and the metadata;

data storage means for storing and managing the video data and the metadata;

data display means for displaying the video data and displaying the metadata; and search condition setting means for setting the search condition for the video data, wherein the metadata generating step includes a step of managing a plurality of the partial video metadata having a time-continuous relationship as whole video metadata, and outputting the respective partial video metadata including, at least, an identifier of the partial video metadata, link information to preceding and succeeding partial video metadata having the time-continuous relationship and link information to the respective partial video data.

\* \* \* \* \*

UNITED STATES PATENT AND TRADEMARK OFFICE
CERTIFICATE OF CORRECTION

| | | |
|---|---|---|
| PATENT NO. | : 7,460,601 B2 | Page 1 of 1 |
| APPLICATION NO. | : 10/282599 | |
| DATED | : December 2, 2008 | |
| INVENTOR(S) | : Koji Taniguchi | |

It is certified that error appears in the above-identified patent and that said Letters Patent is hereby corrected as shown below:

On the Cover Page, FIELD [56], References Cited:

should read --WO 00/45593 8/2000--

On the Cover Page, FIELD [56], References Cited, OTHER PUBLICATIONS:

should read --Dimitrova et al., "On Selective Video Content Analysis and Filtering", SPIE, Vol. 3972, January 26, 2000, pp. 359-368--

At Column 25, line 65, "at a predetermined" should read --at predetermined--

Signed and Sealed this

Eighth Day of September, 2009

David J. Kappos
*Director of the United States Patent and Trademark Office*